US012709993B1

(12) United States Patent
Sellhorn et al.

(10) Patent No.: US 12,709,993 B1
(45) Date of Patent: Aug. 18, 2026

(54) TURBINE SHROUD ASSEMBLY WITH CARRIER COOLING HOLES FOR CARRIER AFT FLANGE

(71) Applicant: Rolls-Royce Corporation, Indianapolis, IN (US)

(72) Inventors: James E. Sellhorn, Indianapolis, IN (US); Ted J. Freeman, Indianapolis, IN (US); Aaron D. Sippel, Indianapolis, IN (US); Clark J. Snyder, Indianapolis, IN (US); David J. Thomas, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 19/346,472

(22) Filed: Sep. 30, 2025

(51) Int. Cl.
*F01D 25/14* (2006.01)
*F01D 11/08* (2006.01)

(52) U.S. Cl.
CPC .............. *F01D 25/14* (2013.01); *F01D 11/08* (2013.01); *F05D 2260/232* (2013.01); *F05D 2260/36* (2013.01); *F05D 2300/6033* (2013.01)

(58) Field of Classification Search
None
See application file for complete search history.

(56) References Cited

U.S. PATENT DOCUMENTS 6,942,445 B2 9/2005 Morris et al.
8,444,372 B2 5/2013 Suthar et al.
8,475,122 B1 7/2013 Liang
8,814,507 B1 8/2014 Campbell et al.
9,464,538 B2 10/2016 Sezer et al.
9,879,557 B2 1/2018 Hall et al.
10,047,624 B2 * 8/2018 O'Leary ............... F01D 25/005
10,370,997 B2 * 8/2019 Vetters ....................... F01D 9/02
10,400,627 B2 9/2019 Ning et al.
10,443,425 B2 10/2019 Romanov et al.
10,577,970 B2 3/2020 Jennings
10,689,998 B2 6/2020 Stapleton et al.
10,837,315 B2 11/2020 Lacy et al.
10,968,772 B2 4/2021 Blaney et al.
10,989,068 B2 4/2021 Packer et al.
11,746,668 B2 9/2023 Jarrossay et al.
2021/0246829 A1 8/2021 Gregg et al.
2026/0036061 A1 * 2/2026 Cook ....................... F01D 11/08

FOREIGN PATENT DOCUMENTS

FR 3121469 A1 10/2022

* cited by examiner

*Primary Examiner* — Courtney D Heinle
*Assistant Examiner* — Danielle M. Christensen
(74) *Attorney, Agent, or Firm* — Barnes & Thornburg

(57) ABSTRACT

A turbine shroud assembly includes a blade track having a shroud wall, and a carrier segment having an aft support wall with at least one axially aft-facing surface. The carrier segment further includes at least one cooling air plenum formed in the aft support wall and at least one cooling air passageway in fluid communication with and extending away from the at least one cooling air plenum through the aft support wall, the at least one cooling air passageway opening at the at least one axially aft-facing surface of the aft support wall so as to conduct cooling air through the carrier segment and direct the cooling air out of the carrier segment so as to cool at least one portion of the aft support wall.

20 Claims, 27 Drawing Sheets

TURBINE SHROUD ASSEMBLY WITH CARRIER COOLING HOLES FOR CARRIER AFT FLANGE

FIELD OF THE DISCLOSURE

The present disclosure relates generally to gas turbine engines, and more specifically to subassemblies of gas turbine engines including ceramic matrix composite materials.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies.

Some shrouds positioned in the turbine may be exposed to high temperatures from products of the combustion reaction in the combustor. Such shrouds sometimes include blade track components made from ceramic matrix composite materials designed to withstand high temperatures. In some examples, coupling ceramic matrix composite components with traditional arrangements and using conventional cooling methods may present problems due to thermal expansion and/or material properties of the ceramic matrix composite components.

SUMMARY

The present disclosure may comprise one or more of the following features and combinations thereof.

According to a first aspect of the present disclosure, a turbine shroud assembly for use with a gas turbine engine includes a blade track segment made of ceramic matrix composite materials and arranged circumferentially at least partway around an axis to define a portion of a gas path of the turbine shroud assembly, the blade track segment having a shroud wall that extends circumferentially partway around the axis, and a carrier segment made of metallic materials that supports the blade track segment to locate the blade track segment radially outward of the axis and arranged circumferentially at least partway around the axis, the carrier segment including an outer wall, a forward support wall that extends radially inward from the outer wall, and an aft support wall that extends radially inward from the outer wall that is located axially aft of the forward support wall, the aft support wall including at least one axially aft-facing surface.

The carrier segment further includes at least one cooling air plenum formed in the aft support wall and at least one cooling air passageway in fluid communication with and extending away from the at least one cooling air plenum through the aft support wall, the at least one cooling air passageway opening at the at least one axially aft-facing surface of the aft support wall so as to conduct cooling air through the carrier segment and direct the cooling air out of the carrier segment so as to cool at least one portion of the aft support wall.

In some embodiments, the aft support wall includes a main wall having a first end connected to the outer wall and a second end opposite of and radially spaced apart from the first end, and the at least one axially aft-facing surface is a first axially aft-facing surface of the main wall.

In some embodiments, the at least one cooling air passageway includes an outlet opening formed in the first axially aft-facing surface of the main wall of the aft support wall.

In some embodiments, the aft support wall further includes an aft support wall flange that extends axially aft away from the first axially aft-facing surface of the main wall at the second end of the main wall, and the cooling air directed out of the outlet opening of the at least one cooling air passageway flows onto a radially outwardly-facing surface of the aft support wall flange so as to cool the aft support wall flange.

In some embodiments, the at least one cooling air passageway extends at least partially radially inwardly from the at least one cooling air plenum to the outlet opening formed in the first axially aft-facing surface of the main wall of the aft support wall such that the cooling air is directed at least partially radially inwardly as it exits the outlet opening and towards the radially outwardly-facing surface of the aft support wall flange.

In some embodiments, the at least one cooling air passageway includes an inlet opening formed in a side wall or a bottom surface of the at least one cooling air plenum, and the inlet opening is located axially forward of the outlet opening such that the at least one cooling air passageway extends at an angle relative to the axis.

In some embodiments, the at least one cooling air passageway includes a plurality of cooling air passageways that each include an outlet opening formed in the first axially aft-facing surface of the main wall of the aft support wall, and each outlet opening of the plurality of cooling air passageways is circumferentially spaced apart from adjacent outlet openings of the plurality of cooling air passageways.

In some embodiments, the at least one cooling air plenum includes a plurality of cooling air plenums, and a first cooling air passageway of the plurality of cooling air passageways extends from a first cooling air plenum of the plurality of cooling air plenums and a second cooling air passageway of the plurality of cooling air passageways extends from a second cooling air plenum of the plurality of cooling air plenums.

In some embodiments, the aft support wall further includes an aft support wall flange that extends axially aft away from the first axially aft-facing surface of the main wall at the second end of the main wall, and an axially aft end of the aft support wall flange includes a second axially aft-facing surface that is axially spaced apart from the first axially aft-facing surface in an axially aft direction, and the at least one cooling air passageway extends through the aft support wall flange and includes an outlet opening formed in the second axially aft-facing surface such that the cooling air flows through the aft support wall flange so as to cool the aft support wall flange.

In some embodiments, the at least one cooling air passageway includes a first portion that extends at least partially radially inwardly from and is in fluid communication with the at least one cooling air plenum and a second portion that extends at least partially axially from and is in fluid communication with the first portion and to the outlet opening formed in the second axially aft-facing surface of the aft support wall flange.

In some embodiments, the first portion of the at least one cooling air passageway extends in a radial direction and the second portion of the at least one cooling air passageway extends in an axial direction such that an orthogonal angle is formed at a junction between the first and second portions.

In some embodiments, the at least one cooling air passageway includes a plurality of cooling air passageways that each include an outlet opening formed in the second axially aft-facing surface of the aft support wall flange of the aft support wall, and each outlet opening of the plurality of cooling air passageways is circumferentially spaced apart from adjacent outlet openings of the plurality of cooling air passageways.

In some embodiments, the at least one cooling air plenum includes a plurality of cooling air plenums, and a first cooling air passageway of the plurality of cooling air passageways extends from a first cooling air plenum of the plurality of cooling air plenums and a second cooling air passageway of the plurality of cooling air passageways extends from a second cooling air plenum of the plurality of cooling air plenums.

According to a further aspect of the present disclosure, a turbine shroud assembly for use with a gas turbine engine includes a blade track segment arranged circumferentially at least partway around an axis, the blade track segment having a shroud wall that extends circumferentially partway around the axis, the shroud wall including an aft flange at an aft end of the shroud wall, and a carrier segment that supports the blade track segment and is arranged circumferentially at least partway around the axis, the carrier segment including an aft support wall, the aft support wall including at least one axially aft-facing surface. The carrier segment further includes a cooling air plenum formed in the aft support wall and a cooling air passageway in fluid communication with and extending away from the cooling air plenum, the cooling air passageway opening at the at least one axially aft-facing surface of the aft support wall so as to cool at least one portion of the aft support wall.

In some embodiments, the aft support wall includes a main wall, the at least one axially aft-facing surface is a first axially aft-facing surface of the main wall, and the at least one cooling air passageway includes an outlet opening formed in the first axially aft-facing surface of the main wall of the aft support wall.

In some embodiments, the at least one cooling air passageway extends at least partially radially inwardly from the at least one cooling air plenum to the outlet opening formed in the first axially aft-facing surface of the main wall of the aft support wall such that the cooling air is directed at least partially radially inwardly as it exits the outlet opening.

In some embodiments, the aft support wall includes a main wall, the at least one axially aft-facing surface is a first axially aft-facing surface of the main wall, the aft support wall further includes an aft support wall flange that extends axially aft away from the first axially aft-facing surface of the main wall, an axially aft end of the aft support wall flange includes a second axially aft-facing surface that is axially spaced apart from the first axially aft-facing surface in an axially aft direction, and the at least one cooling air passageway extends through the aft support wall flange and includes an outlet opening formed in the second axially aft-facing surface.

In some embodiments, the at least one cooling air passageway includes a first portion that extends at least partially radially inwardly from and is in fluid communication with the at least one cooling air plenum and a second portion that extends at least partially axially from and is in fluid communication with the first portion and to the outlet opening formed in the second axially aft-facing surface of the aft support wall flange.

In some embodiments, the at least one cooling air passageway includes a plurality of cooling air passageways that each include an outlet opening formed in the at least one axially aft-facing surface of the aft support wall, and each outlet opening of the plurality of cooling air passageways is circumferentially spaced apart from adjacent outlet openings of the plurality of cooling air passageways.

According to a further aspect of the present disclosure, a method includes arranging a blade track segment made of ceramic matrix composite materials and arranged circumferentially at least partway around an axis to define a portion of a gas path of the turbine shroud assembly, the blade track segment having a shroud wall that extends circumferentially partway around the axis, arranging a carrier segment made of metallic materials circumferentially at least partway around the axis, the carrier segment supporting the blade track segment to locate the blade track segment radially outward of the axis, the carrier segment including an outer wall, a forward support wall that extends radially inward from the outer wall, and an aft support wall that extends radially inward from the outer wall that is located axially aft of the forward support wall, the aft support wall including at least one axially aft-facing surface, forming at least one cooling air plenum in the aft support wall of the carrier segment, and forming at least one cooling air passageway in the carrier segment, the at least one cooling air passageway being in fluid communication with and extending away from the at least one cooling air plenum through the aft support wall, the at least one cooling air passageway opening at the at least one axially aft-facing surface of the aft support wall such that the at least one cooling air passageway is configured to conduct cooling air through the carrier segment and direct the cooling air out of the carrier segment so as to cool at least one portion of the aft support wall.

These and other features of the present disclosure will become more apparent from the following description of the illustrative embodiments.

DETAILED DESCRIPTION

Figure 1:
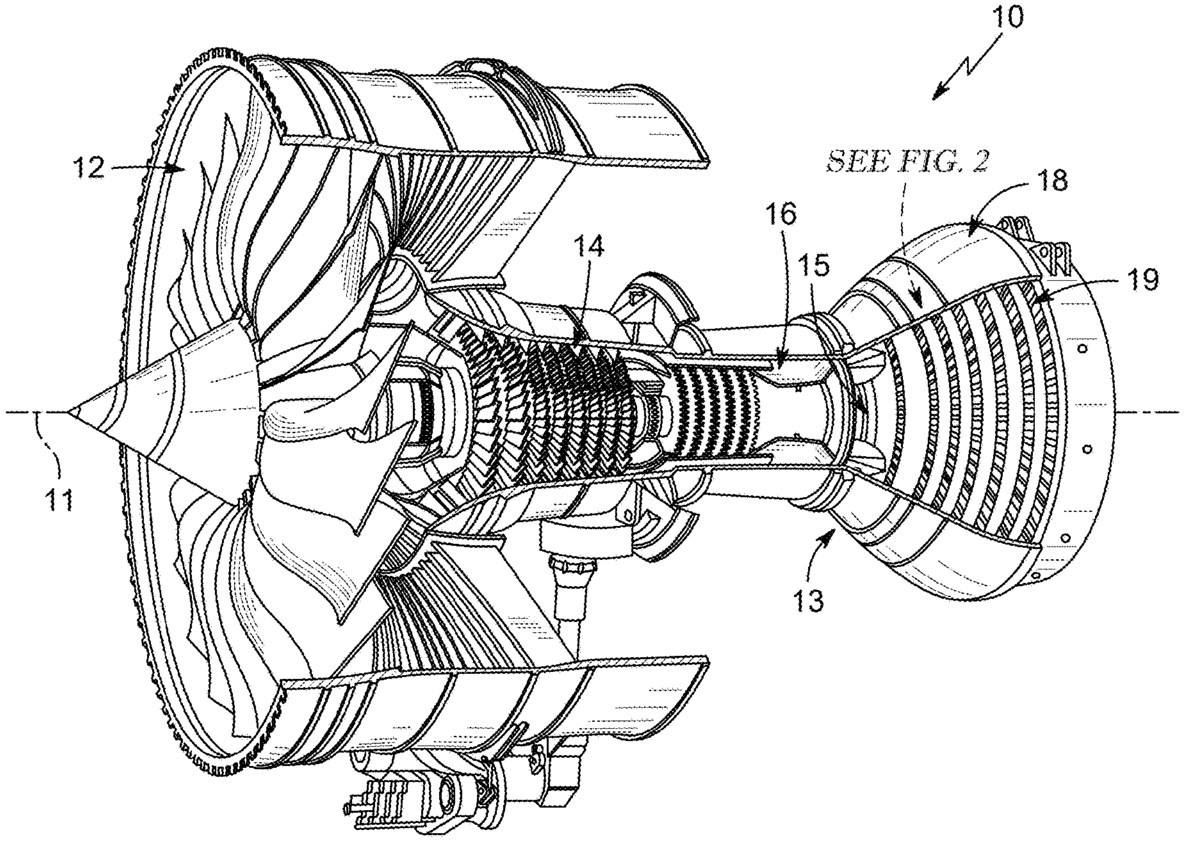
FIG. 1 is a cut-away perspective view of a gas turbine engine showing that the exemplary engine includes a fan, a compressor, a combustor, and a turbine and suggesting that the turbine includes turbine wheel assemblies and static vane assemblies surrounded by a turbine shroud assembly.

For the purposes of promoting an understanding of the principles of the disclosure, reference will now be made to a number of illustrative embodiments illustrated in the drawings and specific language will be used to describe the same.

A turbine shroud segment 26 is shown in FIGS. 2-10 and is adapted for use in a gas turbine engine 10 as shown in FIG. 1. The turbine shroud segment 26 includes a blade track segment 70 arranged circumferentially at least partway around an axis 11 of the gas turbine engine 10 and a carrier segment 30 arranged circumferentially at least partway around the axis 11.

As will be described in greater detail herein, the carrier segment 30 includes a plurality of cooling air passageways 54, 56, 58, 60, 62, 64, 66, 68 formed therein that are configured to direct cooling air 99 from a cooling source (not shown) to an aft flange 76 of the blade track segment 70 so as to cool a portion 77A of a radially outwardly-facing surface 77 of the aft flange 76. In some embodiments, the radially outwardly-facing surface 77 of the aft flange 76 of the blade track segment 70 may include a coating 78, and a portion 78A of the coating 78 may be removed (i.e., a gap 78A in the coating 78 is present) in a region of the portion 77A of the radially outwardly-facing surface 77 so as to allow the cooling air 99 to directly contact and cool the radially outwardly-facing surface 77 of the aft flange 76 at least in the portion 77A.

As can be seen in FIG. 1, the gas turbine engine 10 includes a fan 12, a compressor 14, a combustor 16, and a turbine 18. The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about an axis 11 and drive the compressor 14 and the fan 12. In some embodiments, the fan may be replaced with a propeller, drive shaft, or other suitable configuration.

Figure 2:
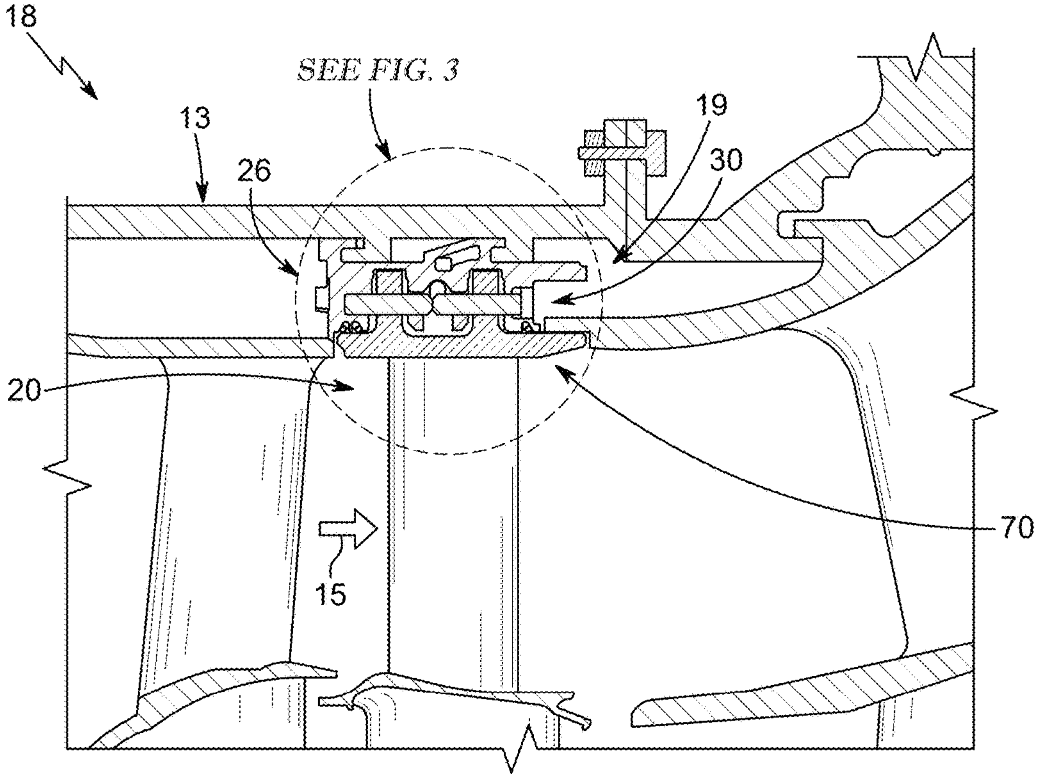
FIG. 2 is a partial cross-sectional view of the gas turbine engine of FIG. 1, showing a portion of the turbine in which the turbine shroud assembly is located radially outward from blades of a turbine wheel assembly to block gases from passing over the blades without interacting with the blades.

The turbine 18 includes at least one turbine wheel assembly 19 and a turbine shroud including a plurality of turbine shroud assemblies 26 positioned to surround the turbine wheel assembly 19, as shown in FIGS. 1 and 2. The turbine wheel assembly 19 includes a plurality of blades 20 coupled to a rotor disk for rotation with the disk. The hot, high pressure combustion products from the combustor 16 are directed toward the blades 20 of the turbine wheel assemblies 19 along the gas path 15. The turbine shroud assemblies 26 are coupled to the outer case 13 of the gas turbine engine 10 and extend around the turbine wheel assembly 19 to block gases from passing over the turbine blades 20 during use of the turbine 18 in the gas turbine engine 10.

In the illustrative embodiment, the turbine shroud is made up of a number of turbine shroud assemblies 26 that each extend circumferentially partway around the axis 11 and are arranged adjacent to each other to surround the turbine wheel assembly 19. In other embodiments, the turbine shroud is annular and non-segmented to extend fully around the axis 11 and surround the turbine wheel assembly 19. In yet other embodiments, certain components of the turbine shroud are segmented while other components are annular and non-segmented.

Each turbine shroud segment 26 includes the carrier segment 30 and the blade track segment 70, as shown in FIG. 2. The blade track segment 70 and the carrier segment 30 are arranged circumferentially partway about the axis 11.

Figure 3:
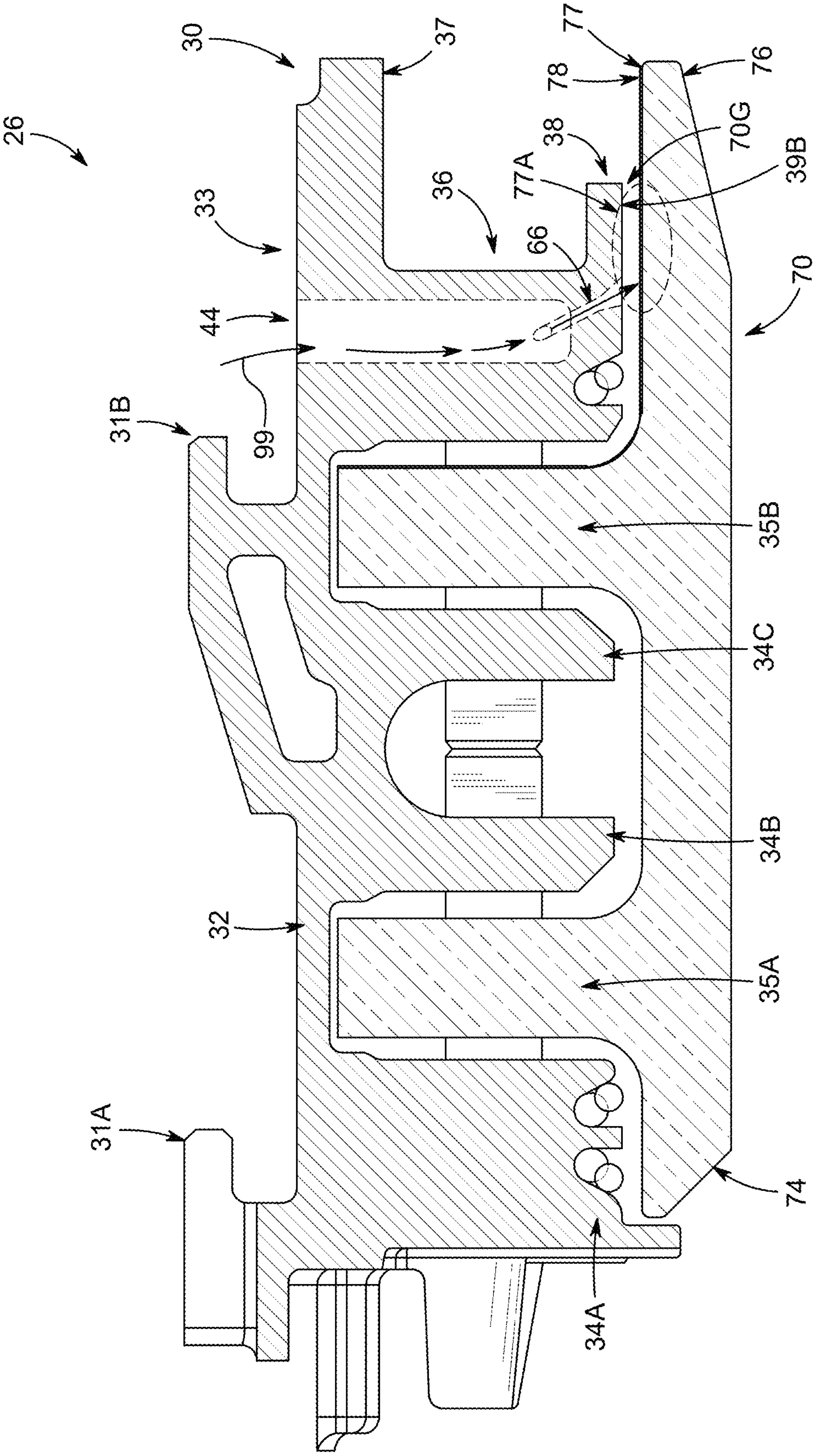
FIG. 3 is a side cross-sectional view of the turbine shroud assembly of FIG. 2 taken through line 8B-8B in FIG. 4, showing that the turbine shroud assembly includes a carrier segment and a blade track segment, and showing that the carrier segment further includes cooling air plenums and cooling air passageways formed in the aft support wall and opening proximate to the aft flange of the shroud wall to cool the aft flange.

The blade track segment 70 can be formed of ceramic matrix composite materials and includes a shroud wall 74 that extends circumferentially partway around the axis 11, as shown in FIG. 2 and FIG. 3. The blade track segment 70 also includes a first attachment flange 35A and a second attachment flange 35B that each extend radially outward from the shroud wall 74. The second attachment flange 35B is spaced apart axially aft from the first attachment flange 35A. Due to the blade track segment 70 directly facing the high temperature gases of the gas path 15, the hot, high-pressure products directed into the turbine 18 from the combustor 16 flow over the shroud wall 74 and heat the blade track segment 70. As such, cooling of particular areas of the blade track segment 70, such as, for example, the aft flange 76 of the shroud wall 74, may be desirable.

The carrier segment 30, which may be formed of metallic materials, includes an outer wall 32, a pair of hangers 31A, 31B, a forward support wall 34A, intermediate flanges 34B, 34C, and an aft support wall 36, as shown in FIG. 2 and FIG. 3. The outer wall 32 extends circumferentially at least partway about the axis 11. The hangers 31A, 31B extend radially outward from the outer wall 32 and engage the case 13 to couple the turbine shroud assembly 26 to the remainder of the engine 10. The forward support wall 34A extends radially inward from the outer wall 32 axially forward of the first attachment flange 35A. The aft support wall 36 extends radially inward from the outer wall 32 axially aft of the second attachment flange 35B.

As can be seen in more detail in FIG. 3, the shroud wall 74 of the blade track segment 70 further includes the aft flange 76 at an aft end of the shroud wall 74. The aft flange 76 extends axially aft beyond the aft support wall 36 and includes a radially outwardly-facing surface 77 that faces the aft support wall 36. The aft support wall 36 includes an aft upper flange 37 extending axially aft from an axially aft-facing surface 36A of the aft support wall 36 at a radially outer end of the aft support wall 36 and an aft support wall flange 38 extending axially aft from the axially aft-facing surface 36A of the aft support wall 36 at a radially inner end of the aft support wall 36, as can be seen in FIG. 3. The aft support wall flange 38 extends axially aft less of a distance than the aft flange 76 of the shroud wall 74 such that an axially aft-facing surface 39C of the aft support wall flange 38 is located axially forward of an aft end of the aft flange 76. The aft support wall flange 38 further includes a radially outwardly-facing surface 39A.

Figure 8A:
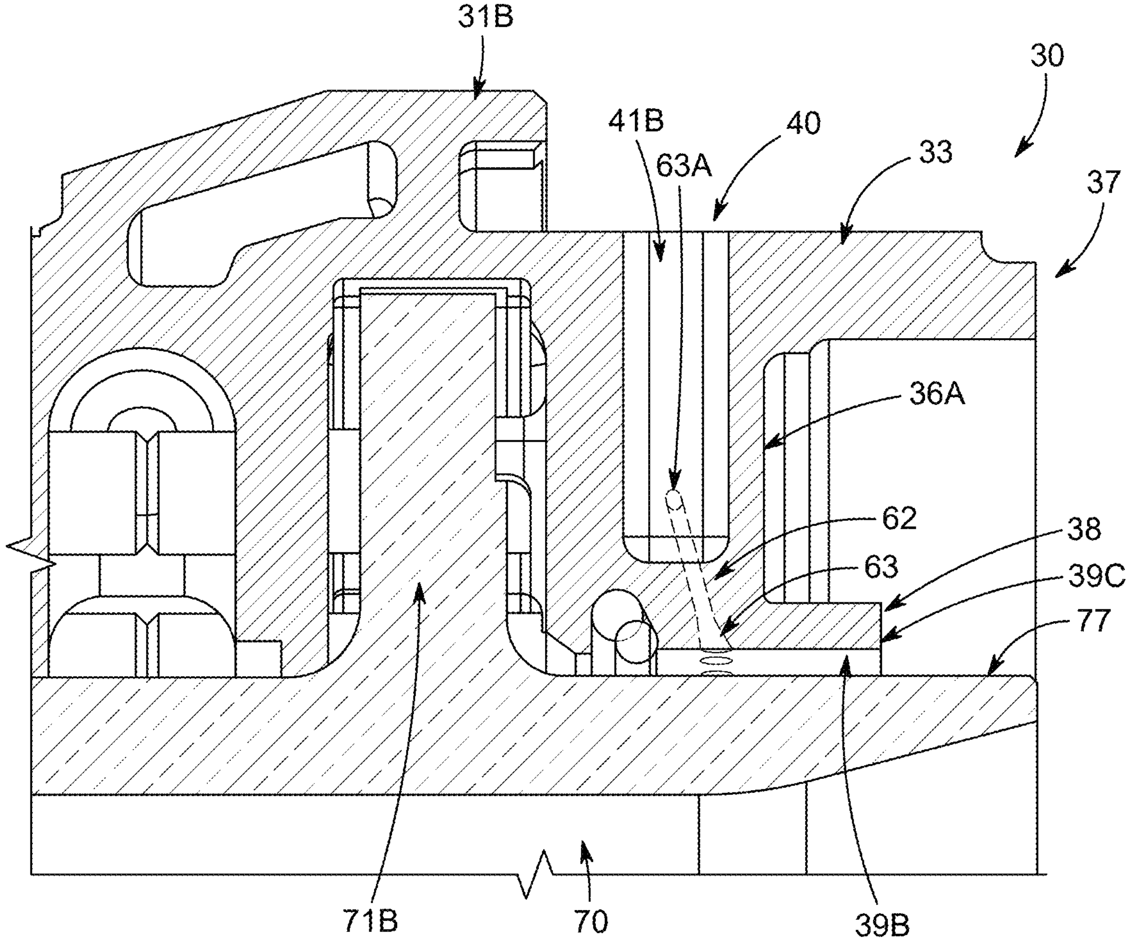
FIG. 8A is a side cross-sectional view of the turbine shroud assembly of FIG. 2 taken through line 8A-8A in FIG. 4, showing a first cooling air plenum and a cooling air passageway extending from the first cooling air plenum.
Figure 8B:
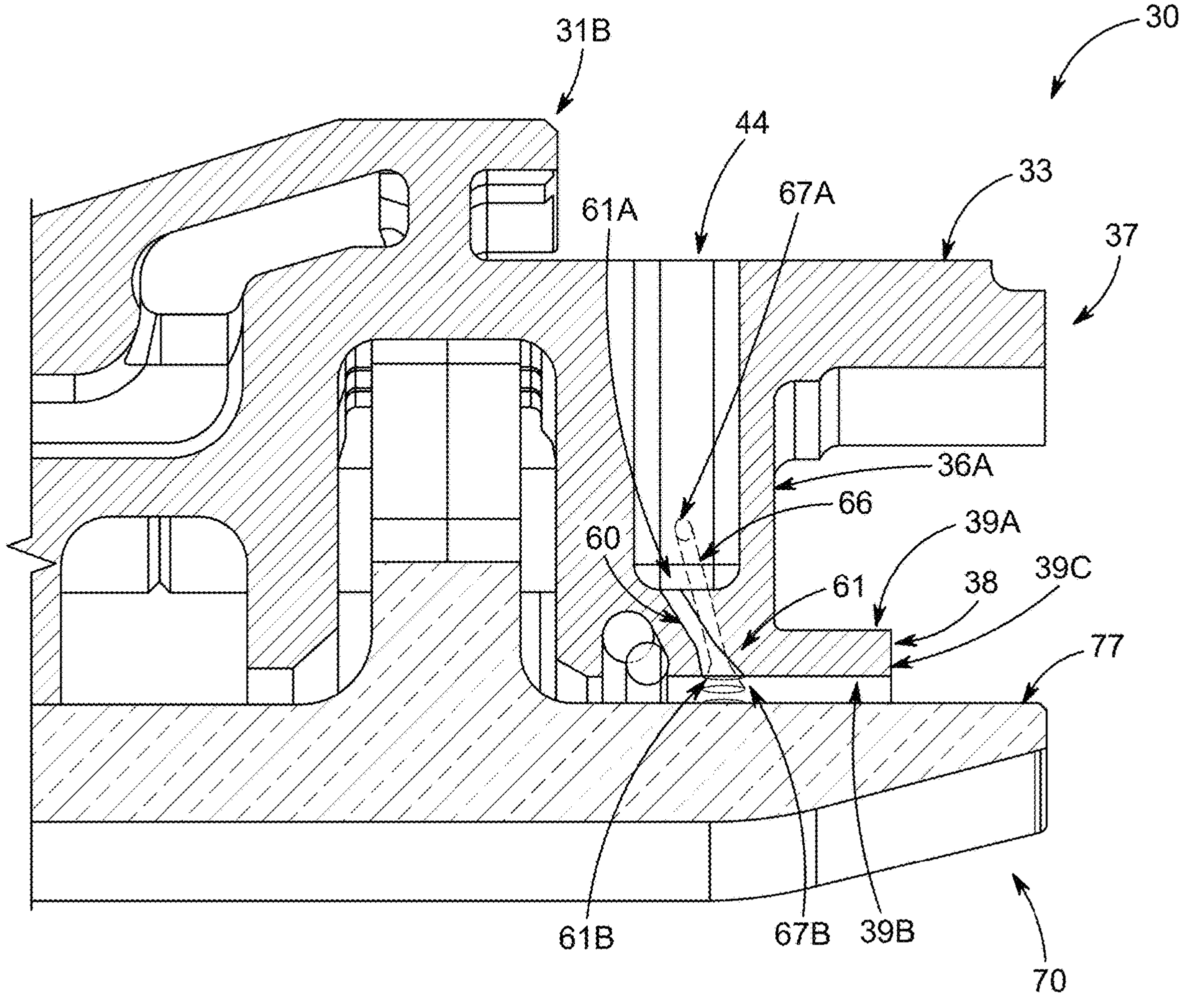
FIG. 8B is a side cross-sectional view of the turbine shroud assembly of FIG. 2 taken through line 8B-8B in FIG. 4, showing a second cooling air plenum and multiple cooling air passageways extending from the second cooling air plenum.

As can be seen in FIGS. 3, 8A, and 8B, the aft support wall 36 includes a radially inwardly-facing surface 39B that extends from a forward end of the aft support wall 36 to the axially aft-facing surface 39C of the aft support wall flange 38. The radially inwardly-facing surface 39B is radially spaced apart from the radially outwardly-facing surface 77 of the aft flange 76 of the shroud wall 74 so as to define a gap 70G between the aft flange 76 and the aft support wall 36 and aft support wall flange 38.

As can be seen in FIGS. 3-9, the turbine shroud assembly 26 further includes at least one cooling air plenum 40, 44, 48 and at least one cooling air passageway 54, 56, 58, 60, 62, 64, 66, 68 formed in the aft support wall 36. As will be described in detail herein, the at least one cooling air passageway 54, 56, 58, 60, 62, 64, 66, 68 extends from a side or bottom surface of one of the cooling air plenums 40, 44, 48 and opens at the radially inwardly-facing surface 39B of the aft support wall 38. Cooling air flows through the at least one cooling air plenum 40, 44, 48 and subsequently through the associated at least one cooling air passageway 54, 56, 58, 60, 62, 64, 66, 68. The cooling air exits the at least one cooling air passageway 54, 56, 58, 60, 62, 64, 66, 68 and is directed onto the radially outwardly-facing surface 77 of the aft flange 76 of the shroud wall 74 of the blade track segment 70 so as to cool the aft flange 76.

Figure 5:
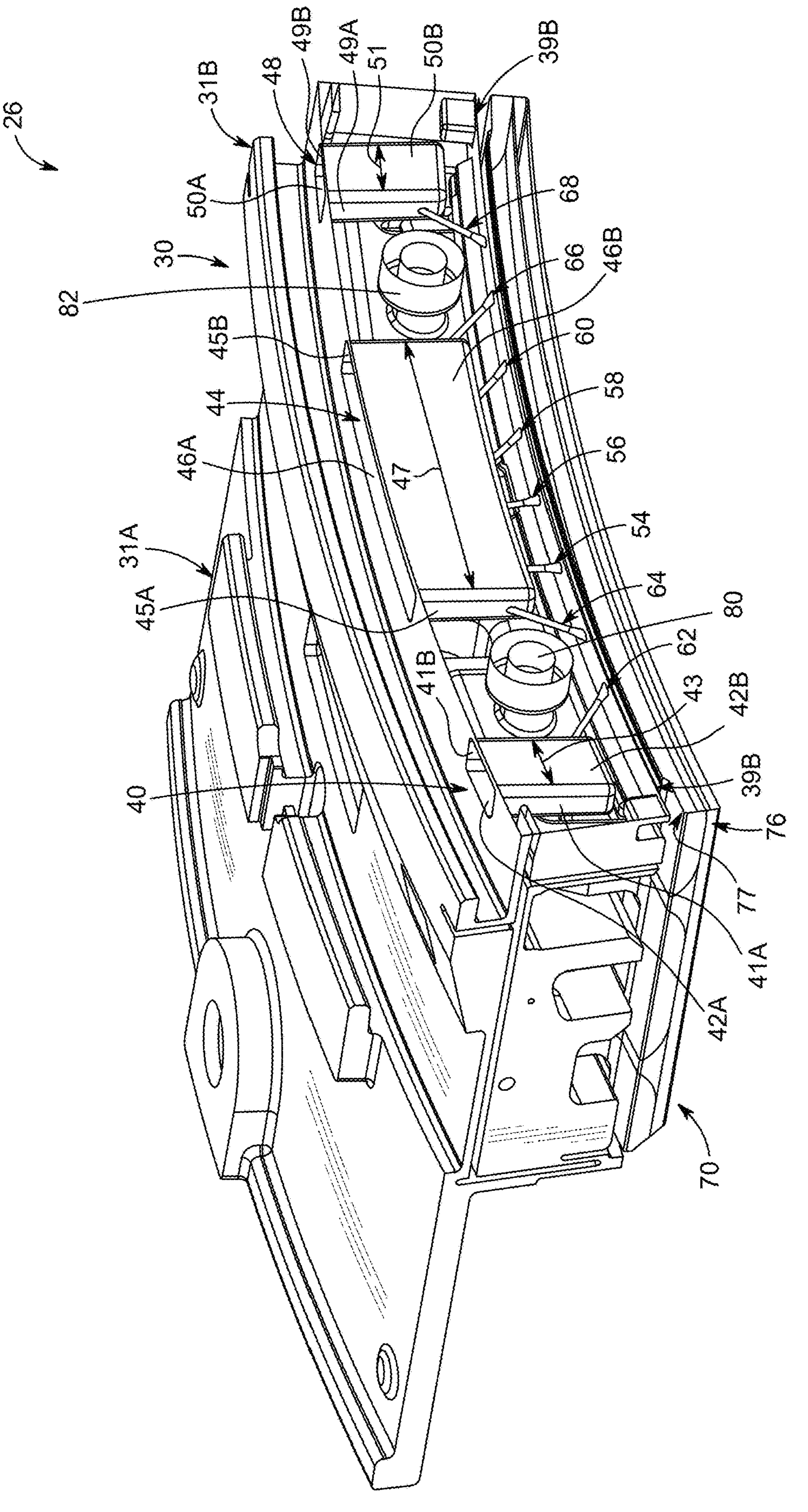
FIG. 5 is a partial cut-away perspective view of the turbine shroud assembly of FIG. 2 with an axially aft-facing surface of the aft support wall removed, showing the three cooling air plenums and the plurality of cooling air passageways formed in the aft support wall.
Figure 6:
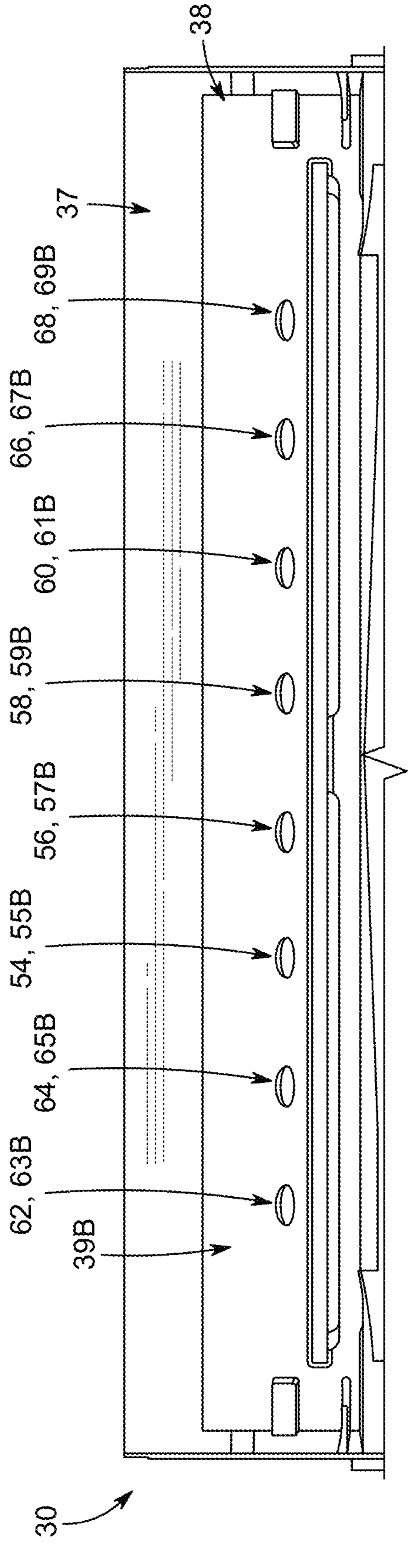
FIG. 6 is a bottom view of the turbine shroud assembly of FIG. 2, showing outlet openings of the plurality of cooling air passageways formed in a radially inwardly-facing surface of the aft support wall.

As can be seen more clearly in FIG. 5, the aft support wall 36 includes three cooling air plenums 40, 44, 48 that are formed as hollow cavities (i.e., interior spaces) in the aft support wall 36 and each open radially outwardly from the top surface 33 of the outer wall 32. A first cooling air plenum 40 of the three cooling air plenums 40, 44, 48 includes opposing circumferential side walls 41A, 41B, opposing axial side walls 42A, 42B, and a bottom surface 40A extending between radially inner ends of the side walls 41A, 41B, 42A, 42B such that the side walls 41A, 41B, 42A, 42B and the bottom surface 40A (see FIG. 7) define the first cooling air plenum 40. In some embodiments, the side walls of the plenums 40, 44, 48 may be referred to as extending radially outwardly away from the respective bottom surfaces of the plenums 40, 44, 48.

Figure 7:
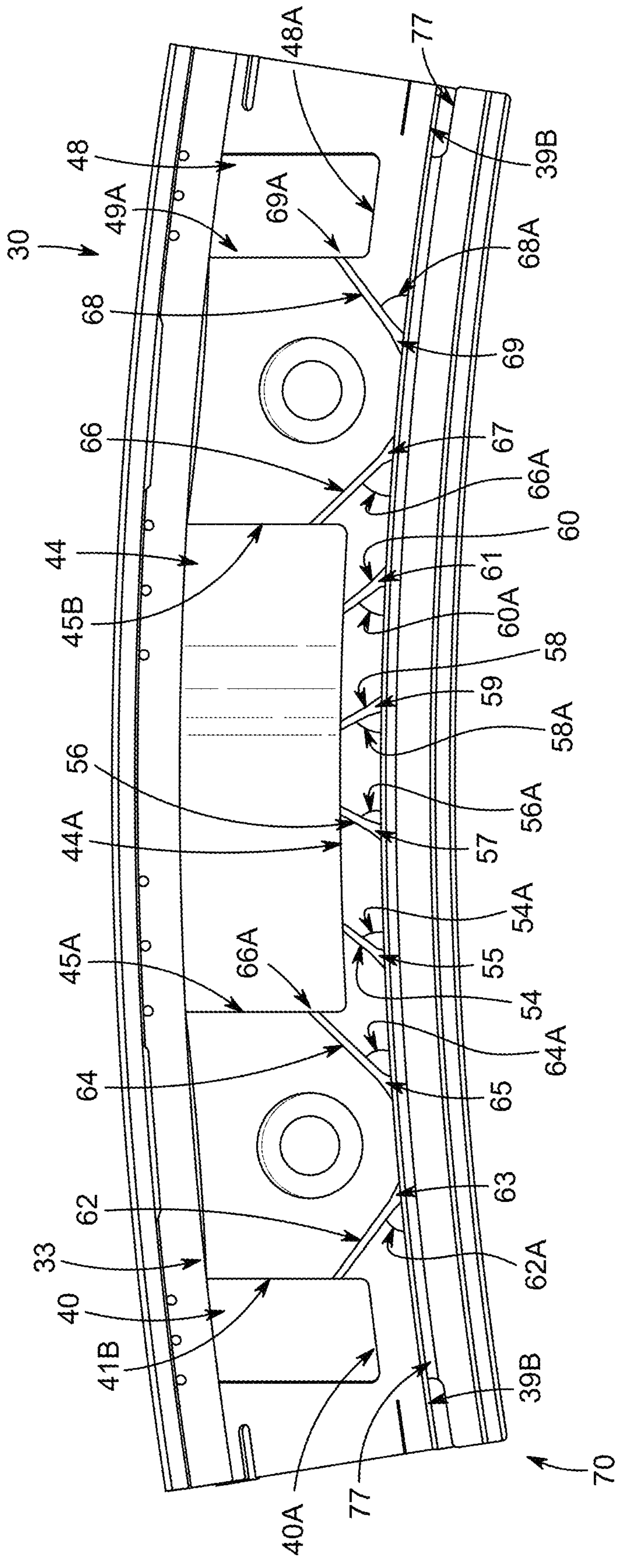
FIG. 7 is a partial cut-away axially forward-facing view of the turbine shroud assembly of FIG. 2 with the axially aft-facing surface of the aft support wall removed, showing the three cooling air plenums and the plurality of cooling air passageways formed in the aft support wall.

Similar to the first cooling air plenum 40, a second cooling air plenum 44 of the three cooling air plenums 40, 44, 48 includes opposing circumferential side walls 45A, 45B, opposing axial side walls 46A, 46B, and a bottom surface 44A (see FIG. 7) extending between radially inner ends of the side walls 45A, 45B, 46A, 46B such that the side walls 45A, 45B, 46A, 46B and the bottom surface 44A define the second cooling air plenum 44. Likewise, a third cooling air plenum 48 of the three cooling air plenums 40, 44, 48 includes opposing circumferential side walls 49A, 49B, opposing axial side walls 50A, 50B, and a bottom surface 48A (see FIG. 7) extending between radially inner ends of the side walls 49A, 49B, 50A, 50B such that the side walls 49A, 49B, 50A, 50B and the bottom surface 48A define the third cooling air plenum 48. As can be seen in FIG. 7, the bottom surfaces 40A, 44A, 48A are radially spaced apart from the radially inwardly-facing surface 39B of the aft support wall 36.

As shown in FIG. 5 and FIG. 7, the cooling air plenums 40, 44, 48 are spaced apart in the circumferential direction. In some embodiments, the circumferential spacing may allow for pins 80, 82 to be located circumferentially between the first and second cooling air plenums 40, 44 and the second and third cooling air plenums 44, 48, the pins 80, 82 extending axially through the support walls 34A, 36, flanges 34B, 34C, and attachment flanges 35A, 35B of the carrier and blade track segments 30, 70 to locate the segments 30, 70 relative to each other.

Illustratively, the central, second cooling air plenum 44 includes a circumferential extent 47 that is larger than the circumferential extents 43, 51 of the circumferentially outer first and third cooling air plenums 40, 48. The second cooling air plenum 44 may be considered to be located centrally in that a center of the circumferential extent 47 is circumferentially aligned with a center of a circumferential extent of the aft support wall 36. In some embodiments, the circumferential extent 47 of the second cooling air plenum 44 is three times larger than the circumferential extents 43, 51 of the first and third cooling air plenums 40, 48. In some embodiments, the circumferential extent 47 of the second cooling air plenum 44 is two times larger than the circumferential extents 43, 51 of the first and third cooling air plenums 40, 48.

Figure 4:
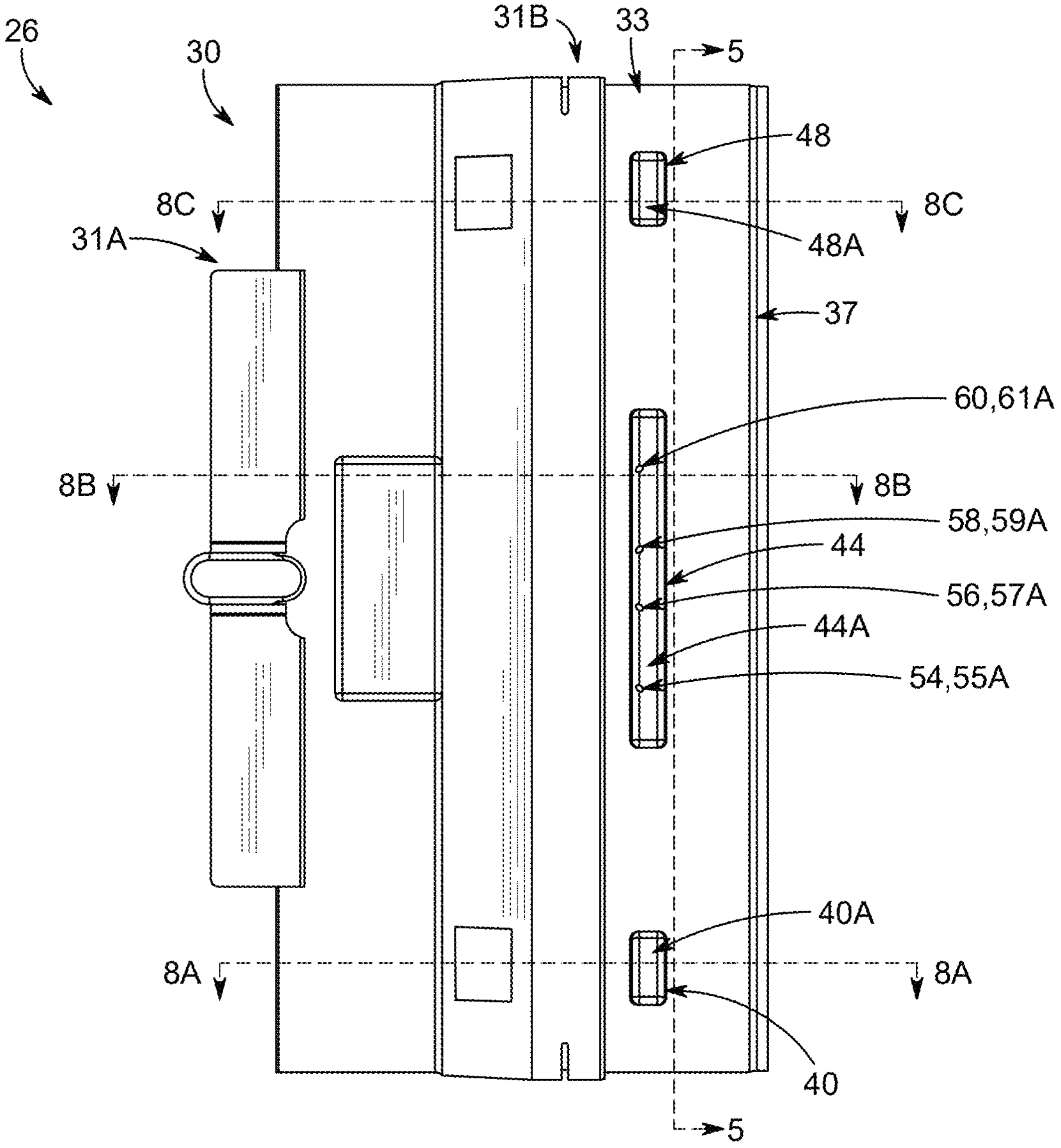
FIG. 4 is a top view of the turbine shroud assembly of FIG. 2, showing that the carrier segment includes three cooling air plenums and a plurality of cooling air passageways formed in the aft support wall.

In some embodiments, the three cooling air plenums 40, 44, 48 each have the same axial extent, as can be seen in FIG. 4. Similarly, the three cooling air plenums 40, 44, 48 each have the same radial extent, as can be seen in FIG. 7. The three cooling air plenums 40, 44, 48 having the same axial and radial extents allows for the same amount of cooling air 99 to enter at least the first and third cooling air plenums 40, 48, thus ensuring even cooling from the passageways 62, 68 associated with the first and third cooling air plenums 40, 48. A person skilled in the art will understand that the cooling air plenums 40, 44, 48 can be formed to have different axial, radial, and circumferential extents based on the desired cooling effect in particular areas of the aft flange 76.

As shown in FIGS. 4-7, the carrier segment 30 further includes a plurality of cooling air passageways 54, 56, 58, 60, 62, 64, 66, 68 formed in the aft support wall 36. The cooling air passageways 54, 56, 58, 60, 62, 64, 66, 68 are formed as elongated tubular passages in the aft support wall 36 and extend from respective cooling air plenums 40, 44, 48 to the radially inwardly-facing surface 39B of the aft support wall 36 proximate to the aft flange 76.

The term "proximate" may refer to the passageways 54, 56, 58, 60, 62, 64, 66, 68 opening radially outwardly of the radially outwardly-facing surface 77 of the aft flange 76 such that cooling air 99 that exits the passageways 54, 56, 58, 60, 62, 64, 66, 68 flows onto the radially outwardly-facing surface 77 of the aft flange 76 so as to cool the flange 76. In some embodiments, the passageways 54, 56, 58, 60, 62, 64, 66, 68 may be oriented such that the outlet openings of the passageways 54, 56, 58, 60, 62, 64, 66, 68 are proximate to a specific area of the aft flange 76 that is to be cooled, such as, for example, the portion 77A of the radially outwardly-facing surface 77 shown in FIG. 3.

Figure 9:
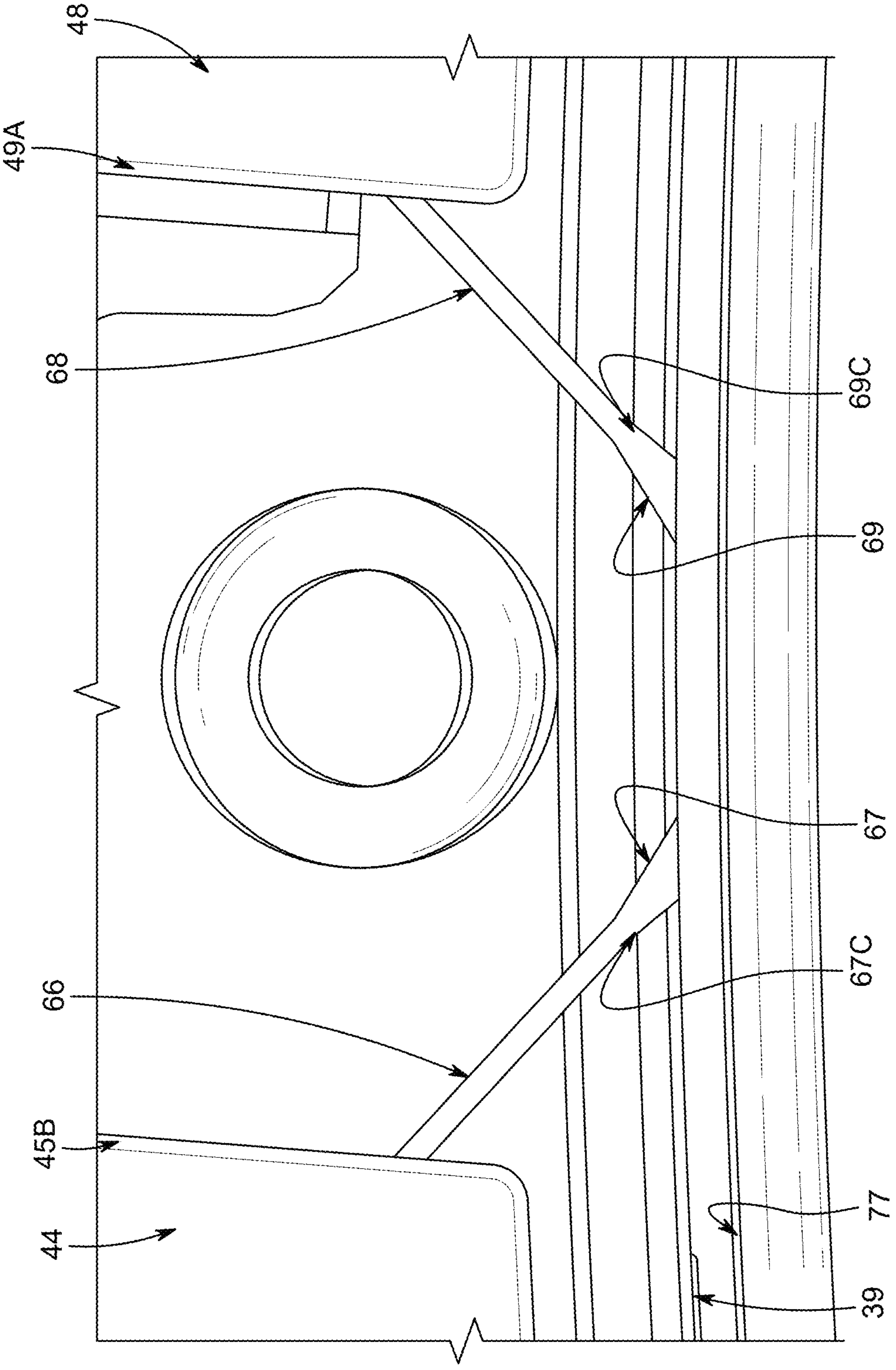
FIG. 9 is a magnified partial cut-away axially forward-facing view of the turbine shroud assembly of FIG. 2 with the axially aft-facing surface of the aft support wall removed, showing that the cooling air passageways include a conical end portion.

As can be seen in FIGS. 4-7, the plurality of cooling air passageways 54, 56, 58, 60, 62, 64, 66, 68 each include inlet openings 55A, 57A, 59A, 61A, 63A, 65A, 67A, 69A and outlet openings 55B, 57B, 59B, 61B, 63B, 65B, 67B, 69B opposite the inlet openings 55A, 57A, 59A, 61A, 63A, 65A, 67A, 69A. Each passageway 54, 56, 58, 60, 62, 64, 66, 68 also includes an end portion 55, 57, 59, 61, 63, 65, 67, 69. As can be seen in FIG. 7 and FIG. 9 in more detail, the end portion 55, 57, 59, 61, 63, 65, 67, 69 can be formed to be conical that expands in the radially inward direction from a main portion of the passageway 54, 56, 58, 60, 62, 64, 66, 68 (i.e., between the inlet openings 55A, 57A, 59A, 61A, 63A, 65A, 67A, 69A and where the cone of the end portion 55, 57, 59, 61, 63, 65, 67, 69 begins) to the outlet opening 55B, 57B, 59B, 61B, 63B, 65B, 67B, 69B such that a width or diameter of the main portion is less than a width or diameter of the outlet opening 55B, 57B, 59B, 61B, 63B, 65B, 67B, 69B. In some embodiments, the main portion may also be referred to a main cylindrical conduit. In some embodiments, the conical end portion or cone of the end portion 55, 57, 59, 61, 63, 65, 67, 69 may also be referred to a conical terminal end. In some embodiments, the cone of the end portion 55, 57, 59, 61, 63, 65, 67, 69 may include a cone inlet opening (see 67C, 69C in FIG. 9) that is connected to the main portion and a second end (i.e., the outlet opening 55B, 57B, 59B, 61B, 63B, 65B, 67B, 69B).

It is noted that the conical end portion or cone of the end portion 55, 57, 59, 61, 63, 65, 67, 69 can be sized relative to the main portion of the passageway 54, 56, 58, 60, 62, 64, 66, 68 in order to achieve desired properties of the cooling air 99 exiting the passageways 54, 56, 58, 60, 62, 64, 66, 68, such as, for example, achieved a desired velocity of cooling air 99, area coverage of cooling air 99, angle of contact of cooling air 99, and other similar parameters related to cooling effectiveness.

As can be seen in FIGS. 4-7, in some embodiments, the plurality of cooling air passageways 54, 56, 58, 60, 62, 64, 66, 68 are oriented such that the outlet openings 55B, 57B, 59B, 61B, 63B, 65B, 67B, 69B are evenly spaced apart on the radially inwardly-facing surface 39B. As a result, the cooling air 99 can be supplied evenly to the radially outwardly-facing surface 77 of the aft flange 76. A person skilled in the art will understand that the orientation of the passageways can be altered in designs in which specific areas of the aft flange 76 are to be cooled more than others, as opposed to the even cooling provided by evenly spaced outlet openings 55B, 57B, 59B, 61B, 63B, 65B, 67B, 69B.

Illustratively, four cooling air passageways 54, 56, 58, 60 extend from the bottom surface 44A of the second cooling air plenum 44, and four cooling air passageways 62, 64, 66, 68 extend from the side walls 41B, 45A, 45B, 49A of the first, second, and third cooling air plenums 40, 44, 48. Specifically, a cooling air passageway 62 extends from the side wall 41B of the first cooling air plenum 40, a cooling air passageway 64 extends from the side wall 45A of the second cooling air plenum 44, a cooling air passageway 66 extends from the side wall 45B of the second cooling air plenum 44, and a cooling air passageway 68 extends from the side wall 49A of the third cooling air plenum 48.

In order for the outlet openings 55B, 57B, 59B, 61B, 63B, 65B, 67B, 69B to be evenly spaced apart on the radially inwardly-facing surface 39B, the cooling air passageways 54, 56, 58, 60, 62, 64, 66, 68 are angled relative to the circumferential direction, as can be seen in FIG. 7. Illustratively, the cooling air passageways 54, 56, 58, 60, 62, 64, 66, 68 extend at angles 54A, 56A, 58A, 60A, 62A, 64A, 66A, 68A. In some embodiments, the angles 62A, 64A, 66A, 68A of the circumferentially outermost passageways 62, 64, 66, 68 are smaller relative to the angles 54A, 60A of the passageways 54, 60, which in turn are smaller than the angles 56A, 58A of the central-most passageways 56, 58. As a result, the central cooling air passageways 54, 56, 58, 60, 64, 66 extend in a fanned pattern. The angled nature of each of the cooling air passageways 54, 56, 58, 60, 62, 64, 66, 68 also results in the cooling air 99 exiting the passageways at the outlet openings 55B, 57B, 59B, 61B, 63B, 65B, 67B, 69B to flow over the radially outwardly-facing surface 77 as opposed to directly impinging on a small area of the surface 77, which may occur if the passageways were to extend entirely radially directly at the surface 77. The flowing of the cooling air 99 over the radially outwardly-facing surface 77 due to the angles of the passageways 54, 56, 58, 60, 62, 64, 66, 68 allows for the cooling air 99 to contact more surface area of the radially directly at the surface 77, thus cooling a larger portion of the aft flange 76.

In addition to the angles 54A, 56A, 58A, 60A, 62A, 64A, 66A, 68A relative to the circumferential direction, the cooling air passageways 54, 56, 58, 60, 62, 64, 66, 68 may also extend at an angle relative to the axial direction from the bottom surface 44A and side walls 41B, 45A, 45B, 49A, as shown in FIGS. 3, 8A, and 8B. Again, these angles cause the cooling air 99 to exit the cooling air passageways 54, 56, 58, 60, 62, 64, 66, 68 at an angle onto the radially directly at the surface 77, thus allowing the cooling air 99 to contact more surface area of the radially directly at the surface 77 and cooling a larger portion of the aft flange 76. In some embodiments, the angles relative to the axial direction of the central passageways 54, 56, 58, 60 are smaller than the angles relative to the axial direction of the circumferentially outer passageways 62, 64, 66, 68, as shown, for example, in FIG. 8B.

A person skilled in the art will understand that the angled orientation of the cooling air passageways 54, 56, 58, 60, 62, 64, 66, 68 shown in the illustrative embodiment may be adjusted in order to provide alternative cooling configurations. For example, in some embodiments, in addition or alternatively to the configuration of cooling air passageways 54, 56, 58, 60, 62, 64, 66, 68 shown in FIGS. 3-9, one or more cooling air passageways may extend from the bottom surface 40A, 48A of one or both of the first and third cooling air plenums 40, 48. This may be useful, for example, if additional cooling is desired in the area of the aft flange 76 directly radially inwardly of the first and third cooling air plenums 40, 48. In some embodiments, the second cooling air plenum 44 may only include cooling air passageways 64, 66 extending from the side walls 45A, 45B and not from the bottom surface 44A. This may be useful, for example, if cooling is not desired in the area of the aft flange 76 directly radially inwardly of the second cooling air plenums 40, 48. Other combinations and configurations of cooling air passageways that may be more or less beneficial for cooling particular areas of the aft flange 76 and any other portion of the carrier and blade track segments 30, 70 are contemplated by the present disclosure.

In operation, cooling air 99 from a cooling air source in the engine 10 may flow into one or more of the cooling air plenums 40, 44, 48, subsequently through the cooling air passageways 54, 56, 58, 60, 62, 64, 66, 68 and exit at the radially inwardly-facing surface 39B via the outlet openings 55B, 57B, 59B, 61B, 63B, 65B, 67B, 69B. The cooling air 99 then flows onto the radially outwardly-facing surface 77 of the aft flange 76, thus cooling the aft flange 76. In some embodiments, the cooling air 99 flows onto the portion 77A shown in FIG. 3, thus cooling at least a portion of the area of the aft flange 76 encapsulated by the portion 77A. The portion 77A may be located at all areas beneath the passageways 54, 56, 58, 60, 62, 64, 66, 68 that the cooling air 99 contacts. A person skilled in the art will understand that the portions of the aft flange 76, the blade track segment 70, and even the carrier segment 30 that can be cooled by the cooling air passageways 54, 56, 58, 60, 62, 64, 66, 68 may include areas outside of the portion 77A (i.e., the support wall 136 itself via cooling air 99 flowing through the cooling air passageways 54, 56, 58, 60, 62, 64, 66, 68, or cooling air 99 leaking forward and cooling portions flange 76 forward of the portion 77A), as the portion 77A is merely shown to illustrate areas that can be cooled by the cooling air passageways 54, 56, 58, 60, 62, 64, 66, 68.

Figure 10:
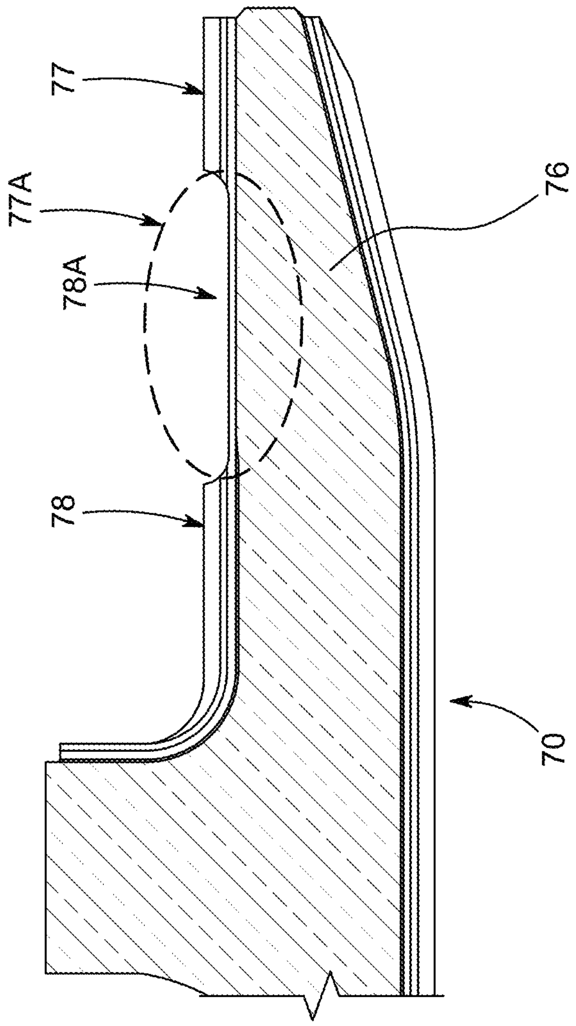
FIG. 10 is a magnified side cross-sectional view of the turbine shroud assembly of FIG. 2, showing the aft flange including a coating and a portion of the coating removed such that the material of the flange can be cooled by the cooling air exiting the cooling air passageways.

In some embodiments, as shown in FIG. 10, the radially outwardly-facing surface 77 of the aft flange 76 of the blade track segment 70 may include a coating 78. In order to allow for additional cooling of the aft flange 76, a portion 78A of the coating 78 may be removed (i.e., a gap 78A in the coating 78 is present) in a region of the portion 77A of the radially outwardly-facing surface 77. In some embodiments, this portion 78A of the coating 78 that is removed may extend circumferentially along an entire area of the portion 77A. As such, this portion 77A of the radially outwardly-facing surface 77 is directly exposed to the cooling air 99 flowing out of the passageways 54, 56, 58, 60, 62, 64, 66, 68, thus allowing the cooling air 99 to contact the radially outwardly-facing surface 77 of the aft flange 76 at least in the portion 77A.

Although three cooling air plenums and eight cooling air passageways are illustrated herein, a person skilled in the art will understand that more or fewer plenums and passageways may be formed in the aft support wall 36 depending on the desired cooling of the aft flange 76. For example, in some embodiments, only a central cooling air plenum 44 and cooling air passageways 54, 56, 58, 60, 64, 66 may be formed in the aft support wall 36 such that only a more central portion of the aft flange 76 is cooled without cooling the circumferentially outer areas of the aft flange 76 that is accomplished by the passageways 62, 68. Similarly, only circumferentially outer cooling air plenums 40, 48 and cooling air passageways 62, 68 may be formed in the aft support wall 36 such that only certain small areas of the aft flange 76 proximate the outlet openings 63B, 69B are cooled without cooling the remainder of the aft flange 76. This variability in the arrangement and formation of the cooling air plenums and cooling air passageways in the aft support wall 36 allows for flexibility in the direction, area, strength, and effect of the cooling applied to the aft flange 76.

Figure 11:
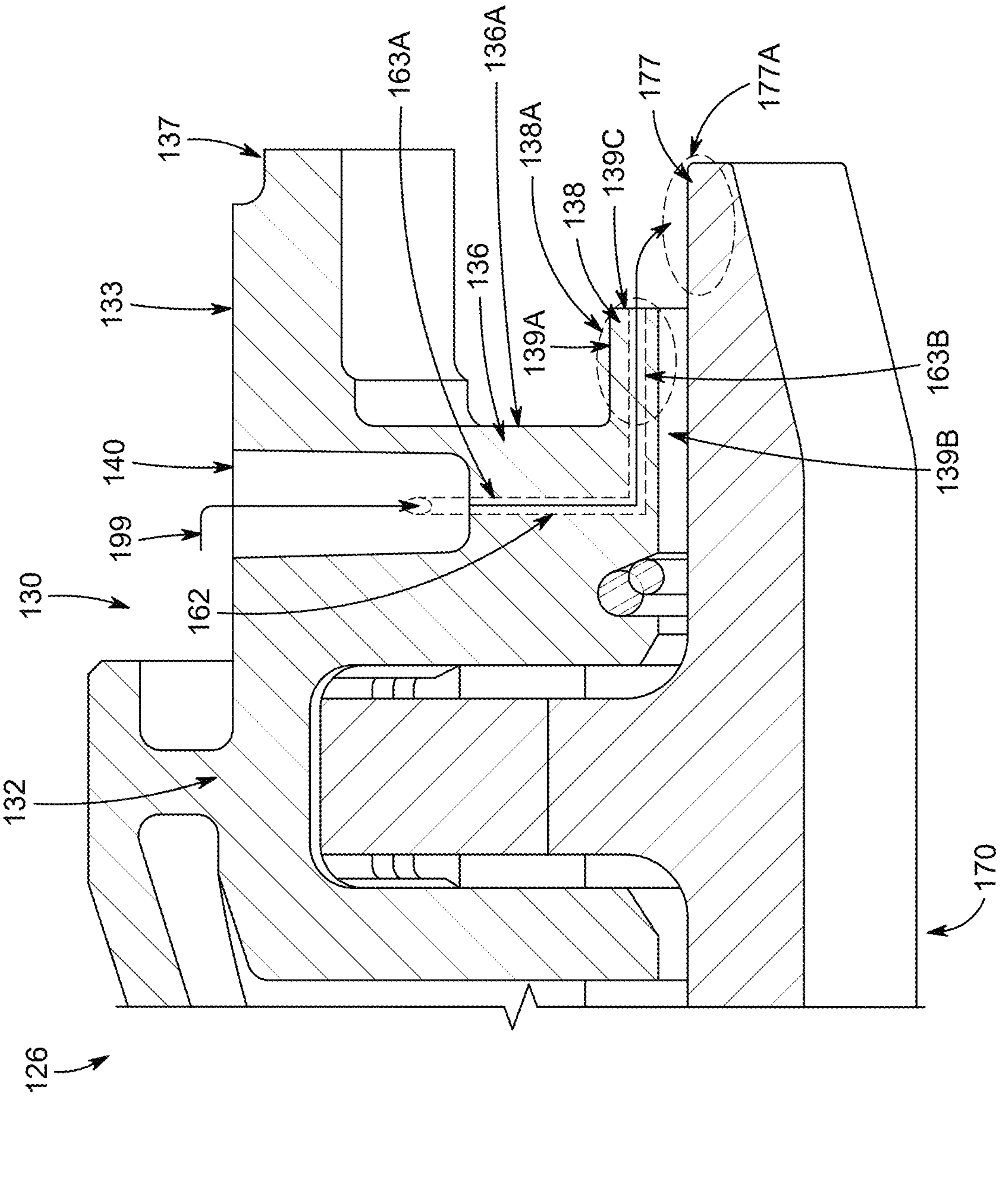
FIG. 11 is a side cross-sectional view of a turbine shroud assembly according to a further aspect of the present disclosure, showing that the aft support wall of the carrier segment includes an aft support wall flange, and that the aft support wall includes cooling air plenums and cooling air passageways formed in the aft support wall, the cooling air passageways extending radially inwardly and through the aft support wall flange so as to cool at least the aft support wall flange.
Figure 12:
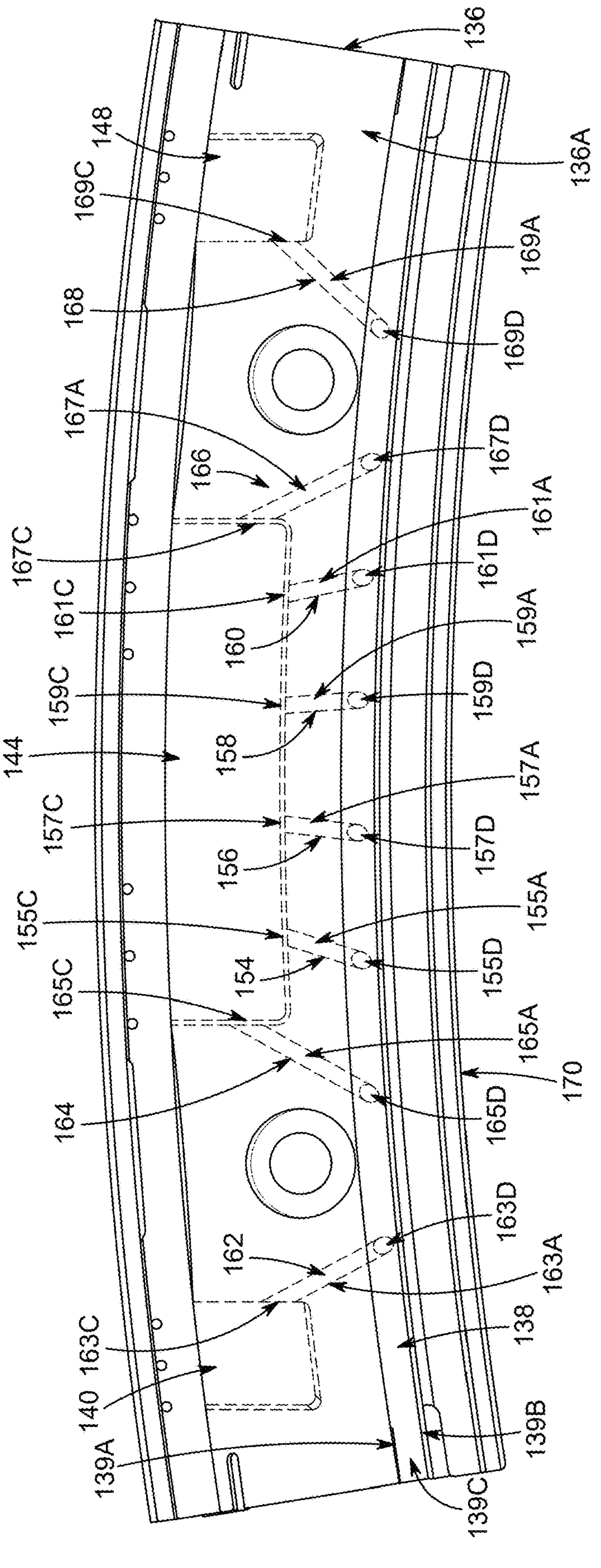
FIG. 12 is an axially forward-facing view of the turbine shroud assembly of FIG. 11, showing that the carrier segment includes three cooling air plenums and a plurality of cooling air passageways formed in the aft support wall.
Figure 13:
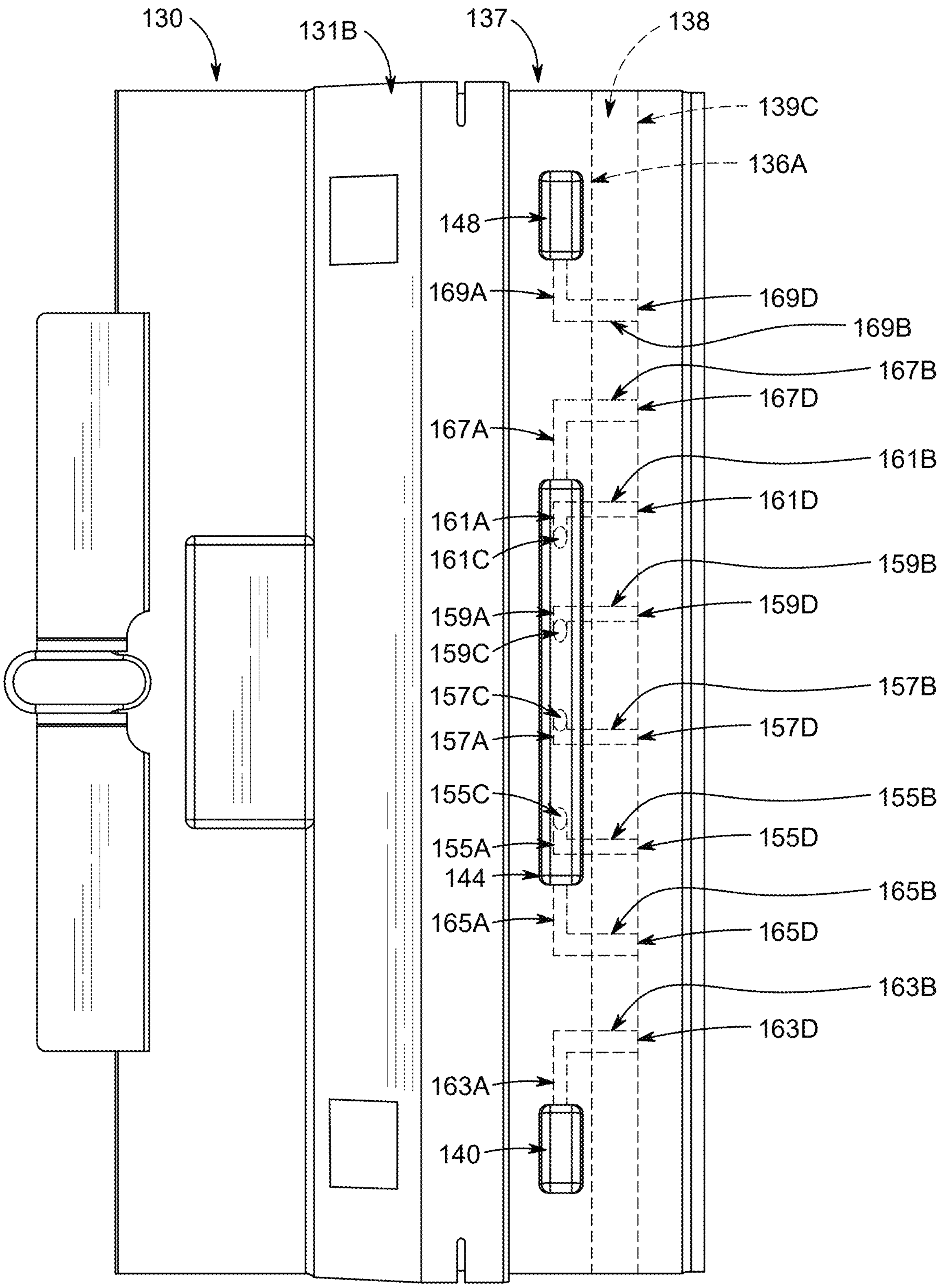
FIG. 13 is a top view of the turbine shroud assembly of FIG. 11, showing the three cooling air plenums and the plurality of cooling air passageways formed in the aft support wall.

Another embodiment of a turbine shroud assembly 126 according to a further aspect of the present disclosure is shown in FIGS. 11-13. The turbine shroud assembly 126 is similar to the turbine shroud assembly 26 shown in FIGS. 2-10 and described herein. Accordingly, similar reference numbers in the 100 series indicate features that are common between the turbine shroud assembly 126 and the turbine shroud assembly 26. The description of the turbine shroud assembly 26 is incorporated by reference to apply to the turbine shroud assembly 126, except in instances when it conflicts with the specific descriptions and the drawings of the turbine shroud assembly 126.

The turbine shroud assembly 126 is similar to the turbine shroud assembly 26, in particular including a carrier segment 130 and blade track segment 170. The carrier segment 130 includes an aft support wall 136 with three cooling air plenums 140, 144, 148 formed therein. The turbine shroud assembly 126 differs from the turbine shroud assembly 26 in that the plurality of cooling air passageways 154, 156, 158, 160, 162, 164, 166, 168 do not extend to the radially inwardly-facing surface 139B and open at the surface 139B, but instead open at the axially aft-facing surface 139C of the aft support wall flange 138 of the aft support wall 136. In some embodiments, the axially aft-facing surface 139C may be considered one of "at least one axially aft-facing surface of the aft support wall," the "at least one axially aft-facing surface of the aft support wall" also including the axially aft-facing surface 136A of the aft support wall 136 itself, as shown in FIG. 11. The axially aft-facing surface 136A may also be referred to as a first axially aft-facing surface and the axially aft-facing surface 139C may also be referred to as a second axially aft-facing surface.

As can be seen in FIGS. 11-13, each of the cooling air passageways 154, 156, 158, 160, 162, 164, 166, 168 includes a radially extending portion 155A, 157A, 159A, 161A, 163A, 165A, 167A, 169A that extends radially inwardly from inlet opening 155C, 157C, 159C, 161C, 163C, 165C, 167C, 169C formed in the side walls and bottom surfaces of the cooling air plenums 140, 144, 148 similarly to the inlet openings of the passageways 54, 56, 58, 60, 62, 64, 66, 68 described with reference to FIGS. 3-10. Also similar to the cooling air passageways 54, 56, 58, 60, 62, 64, 66, 68 of FIGS. 3-10, the cooling air passageways 154, 156, 158, 160, 162, 164, 166, 168 can be oriented at increasing angles from center, as shown in FIG. 12, such that the outlet openings 155D, 157D, 159D, 161D, 163D, 165D, 167D, 169D of the passageways 154, 156, 158, 160, 162, 164, 166, 168 are evenly spaced apart from each other in the circumferential direction on the axially aft-facing surface 139C.

Each of the cooling air passageways 154, 156, 158, 160, 162, 164, 166, 168 further includes an axially extending portion 155B, 157B, 159B, 161B, 163B, 165B, 167B, 169B extending axially away from a radially inner end of the respective radially extending portion 155A, 157A, 159A, 161A, 163A, 165A, 167A, 169A. Illustratively, as can be seen in FIG. 11 and FIG. 13, the axially extending portion 155B, 157B, 159B, 161B, 163B, 165B, 167B, 169B can extend from the radially extending portion 155A, 157A, 159A, 161A, 163A, 165A, 167A, 169A at a junction therebetween an orthogonal angle. In other embodiments, the angle may not be orthogonal, for example, in configurations in which the radially extending portion 155A, 157A, 159A, 161A, 163A, 165A, 167A, 169A extends away from the side or bottom surfaces of the cooling air plenums 140, 144, 148 at an angle relative to the axial direction (i.e., at an angle relative to the forward to aft direction, as would be seen in the view shown in FIG. 11).

The cooling air passageways 154, 156, 158, 160, 162, 164, 166, 168 extending through the aft support wall flange 138 provides cooling to the aft support wall flange 138 due to the cooling air 199 flowing through the cooling air passageways 154, 156, 158, 160, 162, 164, 166, 168. As a result, at least the portion 138A (see FIG. 11) of the aft support wall flange 138 that encloses the cooling air passageways 154, 156, 158, 160, 162, 164, 166, 168 is cooled by the cooling air 199 flowing through the cooling air passageways 154, 156, 158, 160, 162, 164, 166, 168. A person skilled in the art will understand that the portions of the aft support wall 136, the aft support wall flange 138, and the blade track segment 170 that can be cooled by the cooling air passageways 154, 156, 158, 160, 162, 164, 166, 168 may include areas outside of the portion 138A (i.e., the support wall 136 itself via the radially extending portions of the cooling air passageways 154, 156, 158, 160, 162, 164, 166, 168), as the portion 138A is merely shown to illustrate areas that can be cooled by the cooling air passageways 154, 156, 158, 160, 162, 164, 166, 168.

A secondary effect of the cooling air passageways 154, 156, 158, 160, 162, 164, 166, 168 opening at the axially aft-facing surface 139C is that the cooling air 199 can also cool the aft flange 176 of the shroud wall 174 of the blade track segment 170. In such embodiments, cooling air 199 is not directed to the portion 77A of the radially outwardly-facing surface 77 of the aft flange 76 shown in FIGS. 3-10, but instead is directed to a portion 177A of the radially outwardly-facing surface 177 that is further aft of the portion 77A shown in FIGS. 3-10. In particular, the cooling air 199 that exits the cooling air passageways 154, 156, 158, 160, 162, 164, 166, 168 at the axially aft-facing surface 139C flows axially aft and radially inwardly so as to cool an aft end (i.e., the portion 177A) of the aft flange 176.

Figure 14:
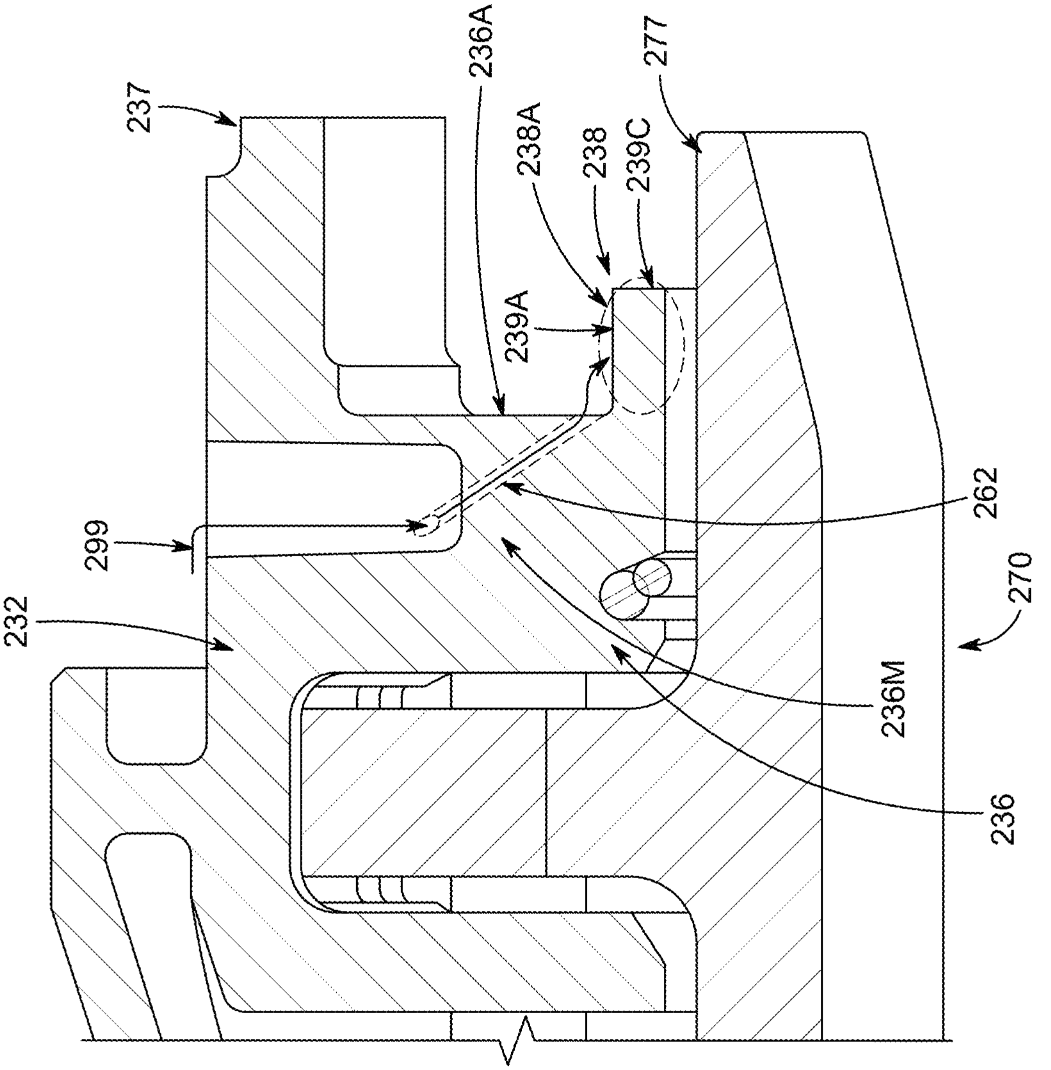
FIG. 14 is a side cross-sectional view of a turbine shroud assembly according to a further aspect of the present disclosure, showing that the aft support wall of the carrier segment includes an aft support wall flange, and that the aft support wall includes cooling air plenums and cooling air passageways formed in the aft support wall, the cooling air passageways extending radially inwardly having an outlet opening at an axially aft-facing surface of the aft support wall such that cooling air exits at the axially aft-facing surface and directed onto the aft support wall flange so as to cool at least the aft support wall flange.
Figure 15:
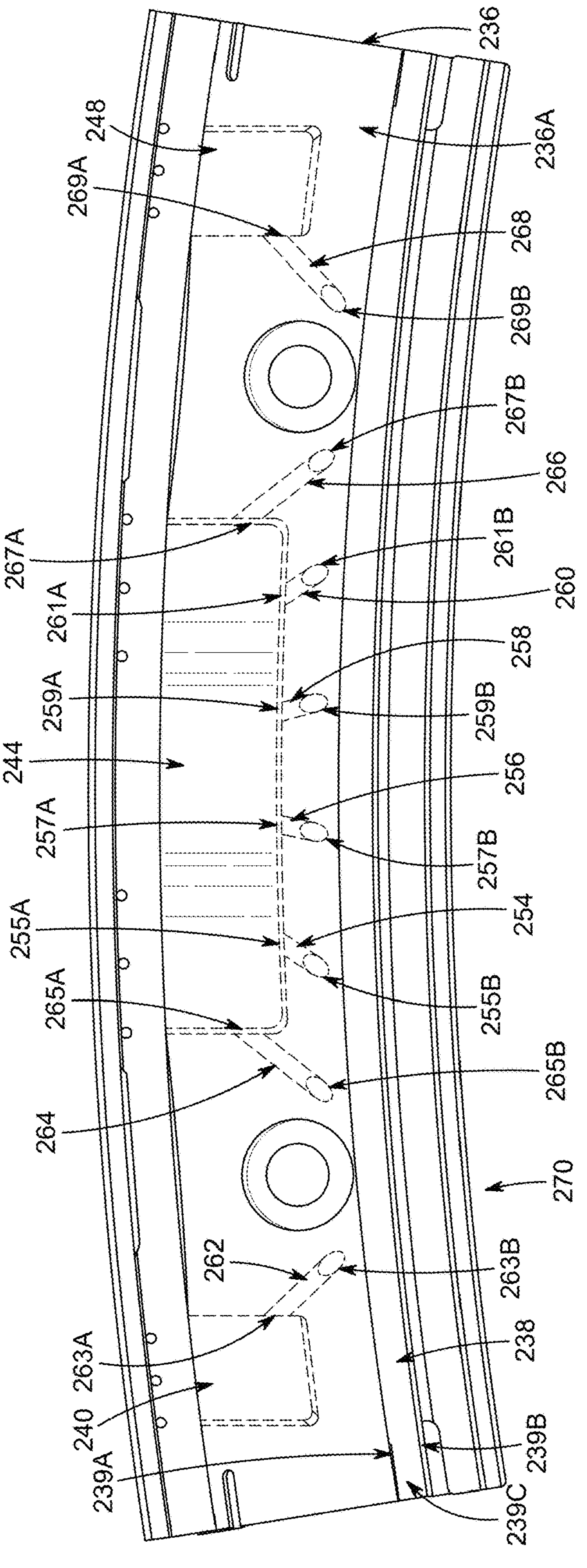
FIG. 15 is an axially forward-facing view of the turbine shroud assembly of FIG. 14, showing that the carrier segment includes three cooling air plenums and a plurality of cooling air passageways formed in the aft support wall.
Figure 16:
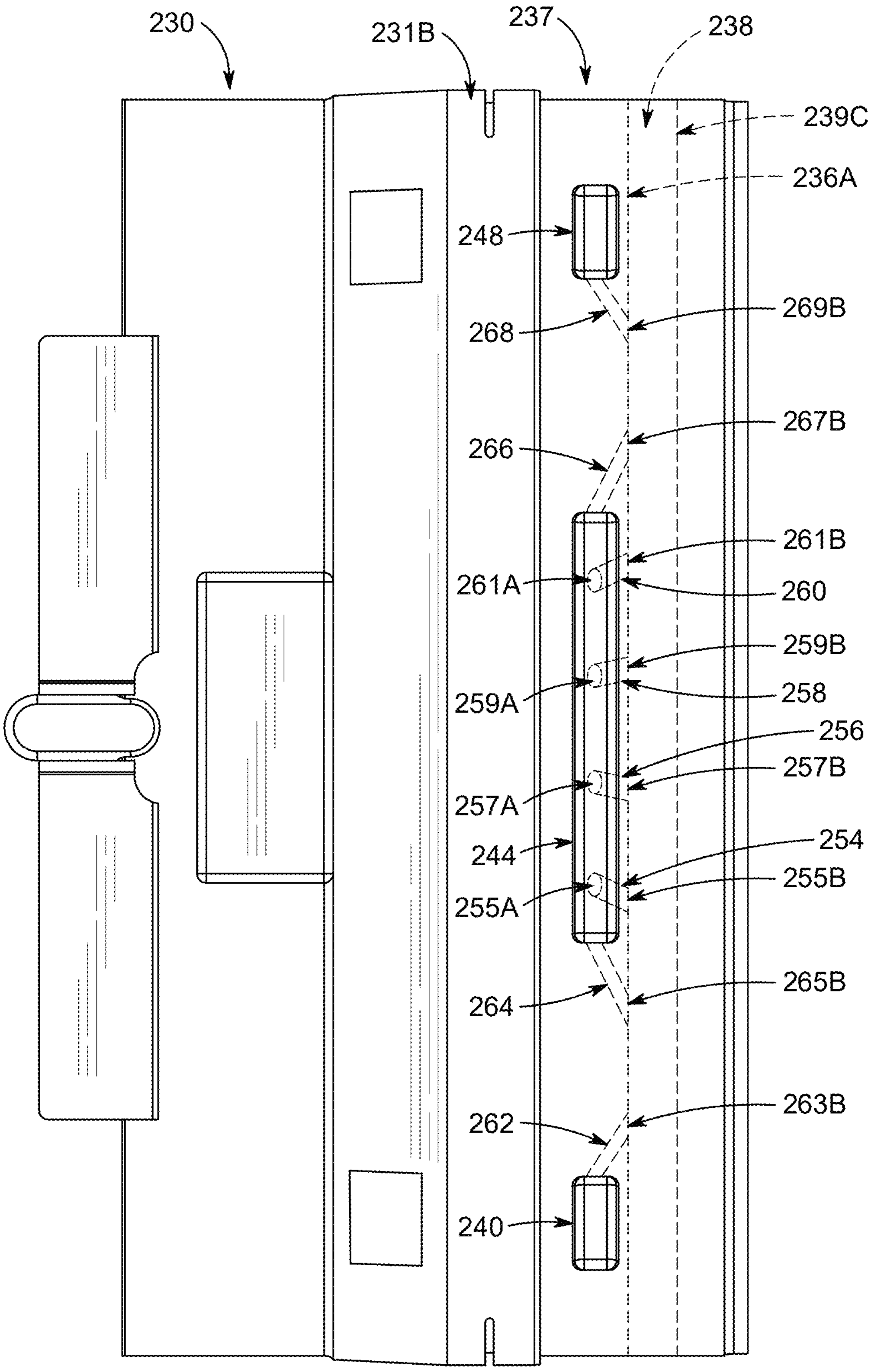
FIG. 16 is a top view of the turbine shroud assembly of FIG. 14, showing the three cooling air plenums and the plurality of cooling air passageways formed in the aft support wall.

Another embodiment of a turbine shroud assembly 226 according to a further aspect of the present disclosure is shown in FIGS. 14-16. The turbine shroud assembly 226 is similar to the turbine shroud assemblies 26, 126 shown in FIGS. 2-13 and described herein. Accordingly, similar reference numbers in the 200 series indicate features that are common between the turbine shroud assembly 226 and the turbine shroud assemblies 26, 126. The descriptions of the turbine shroud assemblies 26, 126 are incorporated by reference to apply to the turbine shroud assembly 226, except in instances when they conflict with the specific descriptions and the drawings of the turbine shroud assembly 226.

The turbine shroud assembly 226 is similar to the turbine shroud assembly 126, in particular including a carrier segment 230 and blade track segment 270. The carrier segment 230 includes an aft support wall 236 with three cooling air plenums 240, 244, 248 formed therein. The turbine shroud assembly 226 differs from the turbine shroud assembly 126 in that the plurality of cooling air passageways 254, 256, 258, 260, 262, 264, 266, 268 do not extend to the axially aft-facing surface 239C and open at the surface 239C, but instead extend to and open at the axially aft-facing surface 236A of the aft support wall 236.

In some embodiments, the aft support wall 236 includes a main wall 236M that has a first end connected to the outer wall 232 and a second end opposite of and radially spaced apart from the first end, the second end including the radially inwardly-facing surface 239B. The aft support wall 236 further includes an aft support wall flange 238 that extends axially aft away from the main wall 236M at the second end, in particular axially aft away from the axially aft-facing surface 236A. In some embodiments, the axially aft-facing surface 236A of the aft support wall 236 may be considered one of "at least one axially aft-facing surface of the aft support wall," the "at least one axially aft-facing surface of the aft support wall" also including the axially aft-facing surface 239C of the aft support wall flange 238, as shown in FIG. 14. The axially aft-facing surface 236A may also be referred to as a first axially aft-facing surface and the axially aft-facing surface 239C may also be referred to as a second axially aft-facing surface.

As can be seen in FIGS. 14-16, each of the cooling air passageways 254, 256, 258, 260, 262, 264, 266, 268 extends radially inwardly from an inlet opening 255A, 257A, 259A, 261A, 263A, 265A, 267A, 269A formed in the side walls and bottom surfaces of the cooling air plenums 240, 244, 248 to an outlet opening 255B, 257B, 259B, 261B, 263B, 265B, 267B, 269B formed in the axially aft-facing surface 236A. The inlet opening 255A, 257A, 259A, 261A, 263A, 265A, 267A, 269A formed in the side walls and bottom surfaces of the cooling air plenums 240, 244, 248 is similar to the inlet openings of the passageways 54, 56, 58, 60, 62, 64, 66, 68 described with reference to FIGS. 3-10. Also similar to the cooling air passageways 54, 56, 58, 60, 62, 64, 66, 68 of FIGS. 3-10, the cooling air passageways 254, 256, 258, 260, 262, 264, 266, 268 can be oriented at increasing angles from center, as shown in FIG. 15, such that the outlet openings 255B, 257B, 259B, 261B, 263B, 265B, 267B, 269B of the passageways 254, 256, 258, 260, 262, 264, 266, 268 are evenly spaced apart from each other in the circumferential direction on the axially aft-facing surface 236A.

As can also be seen in FIG. 14 and FIG. 16, cooling air passageways 254, 256, 258, 260, 262, 264, 266, 268 extend radially inwardly away from the side or bottom surfaces of the cooling air plenums 240, 244, 248 at an angle relative to the axial direction (i.e., at an angle relative to the forward to aft direction, as would be seen in the view shown in FIG. 14). Similar to the cooling air passageways 54, 56, 58, 60, 62, 64, 66, 68, the angles of the passageways 262, 264, 266, 268 that extend from the side surfaces of the cooling air plenums 240, 244, 248 are larger than the angles of the passageways 254, 256, 258, 260 that extend from the bottom surfaces 240A, 244A, 248A, thus ensuring the outlet opening 255B, 257B, 259B, 261B, 263B, 265B, 267B, 269B are located at a constant radial position relative to the axis 11 along the circumferential extent of the axially aft-facing surface 236A.

In operation, the cooling air 299 exiting the cooling air passageways 254, 256, 258, 260, 262, 264, 266, 268 flows onto a radially outwardly-facing surface 239A of the aft support wall flange 238, thus providing cooling to the aft support wall flange 238. As a result, at least the portion 238A (see FIG. 14) of the aft support wall flange 238 is cooled by the cooling air 299 flowing through the cooling air passageways 254, 256, 258, 260, 262, 264, 266, 268. The angle of the cooling air passageways 254, 256, 258, 260, 262, 264, 266, 268 relative to the axial direction results in the cooling air 299 exiting the passageways at the outlet openings 255B, 257B, 259B, 261B, 263B, 265B, 267B, 69B to flow over the radially outwardly-facing surface 239A as opposed to directly impinging on a small area of the surface 239A.

A person skilled in the art will understand that the portions of the aft support wall 236, the aft support wall flange 238, and the blade track segment 270 that can be cooled by the cooling air passageways 254, 256, 258, 260, 262, 264, 266, 268 may include areas outside of the portion 238A (i.e., the support wall 236 itself via the cooling air passageways 254, 256, 258, 260, 262, 264, 266, 268 extending therethrough, or a portion of the cooling air 299 flowing past the aft support wall flange 238 and onto the radially outwardly-facing surface 277 of the aft flange 276) as the portion 238A is merely shown to illustrate areas that can be cooled by the cooling air passageways 254, 256, 258, 260, 262, 264, 266, 268.

A method according to a further aspect of the present disclosure includes arranging a blade track segment 170, 270 made of ceramic matrix composite materials and arranged circumferentially at least partway around the axis 11 to define a portion of the gas path 15 of a turbine shroud assembly 126, 226, the blade track segment 170, 270 having a shroud wall 174, 274 that extends circumferentially partway around the axis 11, and arranging a carrier segment 130, 230 made of metallic materials circumferentially at least partway around the axis 11, the carrier segment 130, 230 supporting the blade track segment 170, 270 to locate the blade track segment 170, 270 radially outward of the axis 11, the carrier segment 130, 230 including an outer wall 132, 232, a forward support wall 134A, 234A that extends radially inward from the outer wall 132, 232, and an aft support wall 136, 236 that extends radially inward from the outer wall 132, 232 that is located axially aft of the forward support wall 134A, 234A, the aft support wall 136, 236 including at least one axially aft-facing surface 139C, 236A.

The method can further include forming at least one cooling air plenum 140, 144, 148, 240, 244, 248 in the aft support wall 136, 236 of the carrier segment 130, 230, and forming at least one cooling air passageway 154, 156, 158, 160, 162, 164, 166, 168, 254, 256, 258, 260, 262, 264, 266, 268 in the carrier segment 130, 230, the at least one cooling air passageway 154, 156, 158, 160, 162, 164, 166, 168, 254, 256, 258, 260, 262, 264, 266, 268 being in fluid communication with and extending away from the at least one cooling air plenum 140, 144, 148, 240, 244, 248 through the aft support wall 136, 236, the at least one cooling air passageway 154, 156, 158, 160, 162, 164, 166, 168, 254, 256, 258, 260, 262, 264, 266, 268 opening at the at least one axially aft-facing surface 139C, 236A of the aft support wall 136, 236 such that the at least one cooling air passageway 154, 156, 158, 160, 162, 164, 166, 168, 254, 256, 258, 260, 262, 264, 266, 268 is configured to conduct cooling air 199, 299 through the carrier segment 130, 230 and direct the cooling air 199, 299 out of the carrier segment 130, 230 so as to cool at least one portion of the aft support wall 136, 236.

Figure 17:
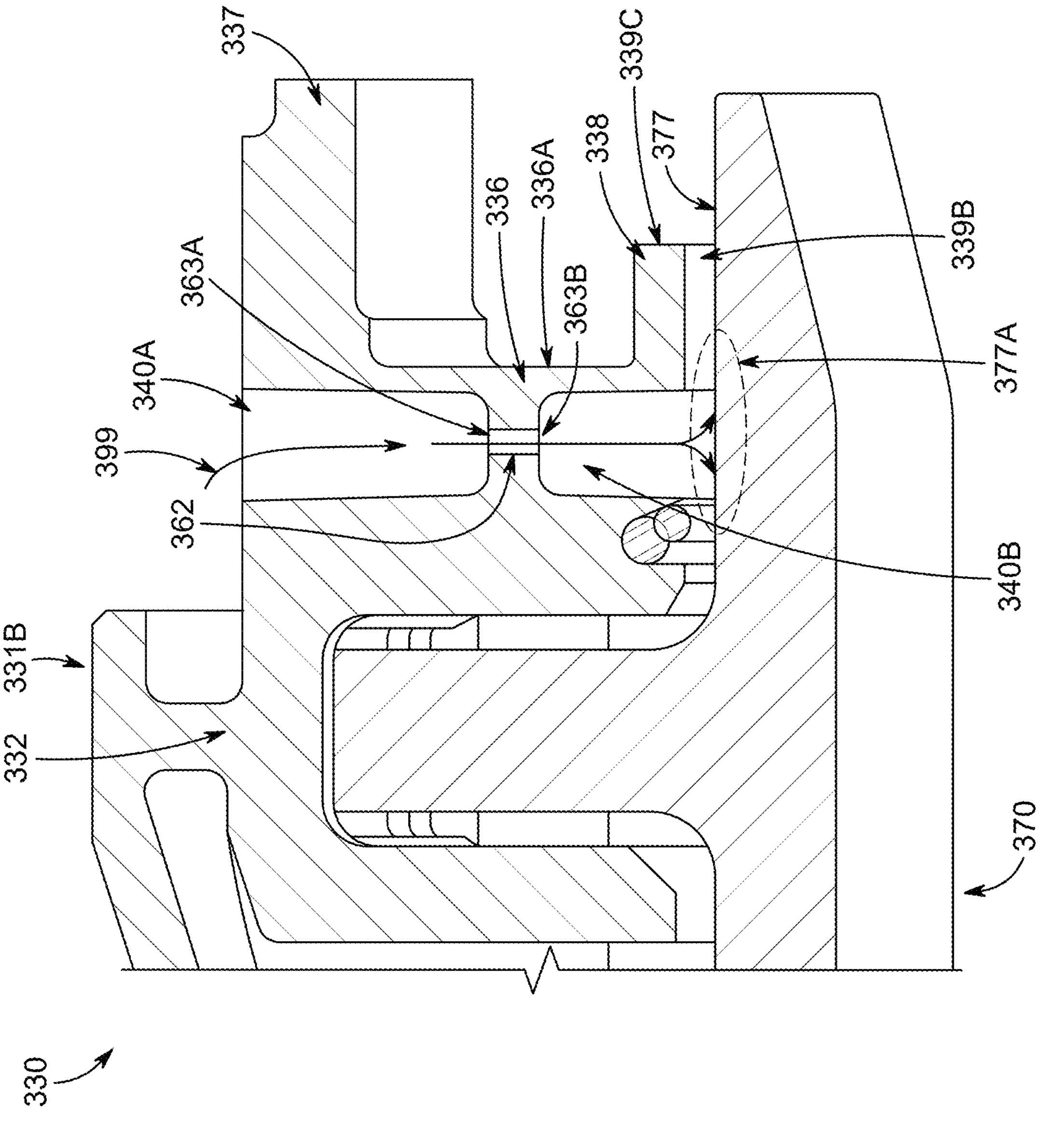
FIG. 17 is a side cross-sectional view of a turbine shroud assembly according to a further aspect of the present disclosure, showing that the aft support wall of the carrier segment includes an aft support wall flange, and that the aft support wall includes first cooling air plenums formed radially outwardly in the aft support wall and second cooling air plenums formed radially inwardly in the aft support wall and spaced apart from the first cooling air plenums and fluidically connected thereto, the cooling air flowing from the first cooling air plenums to the corresponding second cooling air plenums and exiting the second cooling air plenums at a radially inwardly-facing surface of the aft support wall so as to cool the aft flange of the blade track segment.
Figure 18:
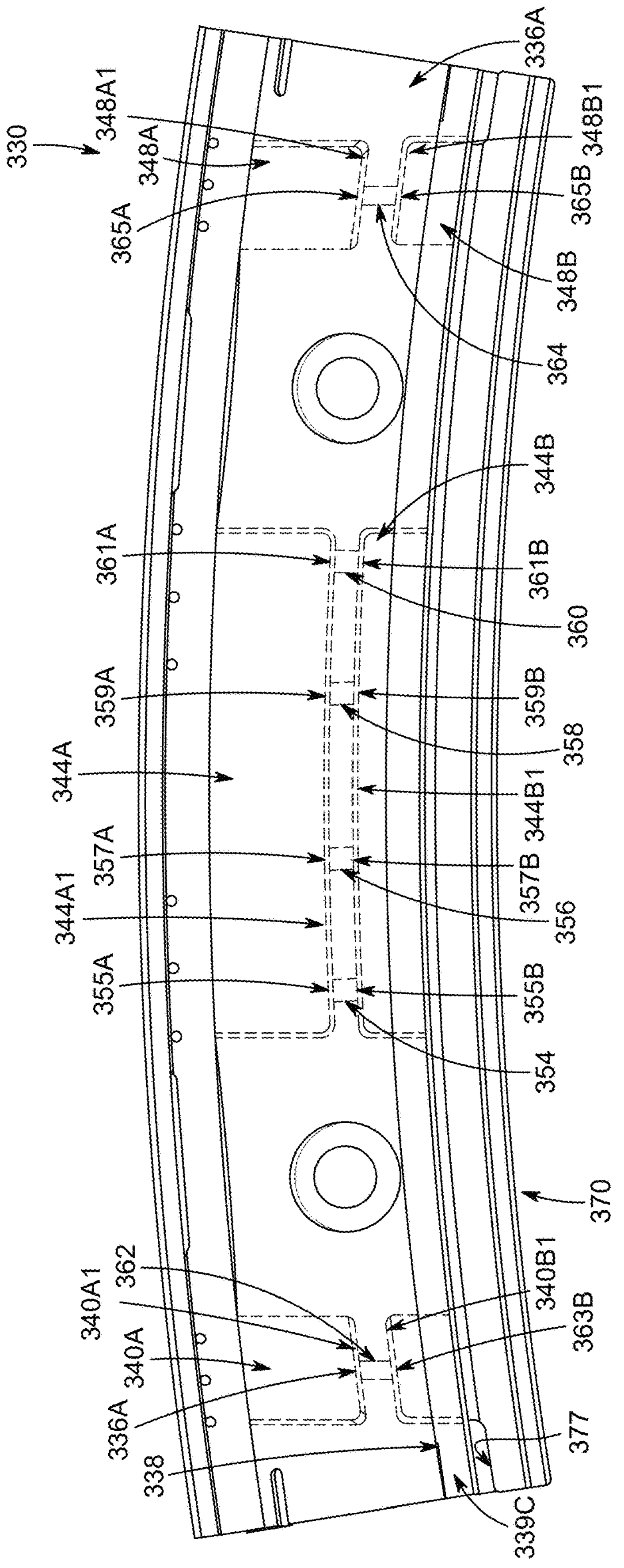
FIG. 18 is an axially forward-facing view of the turbine shroud assembly of FIG. 17, showing that the carrier segment includes three cooling air plenums and a plurality of cooling air passageways formed in the aft support wall.
Figure 19:
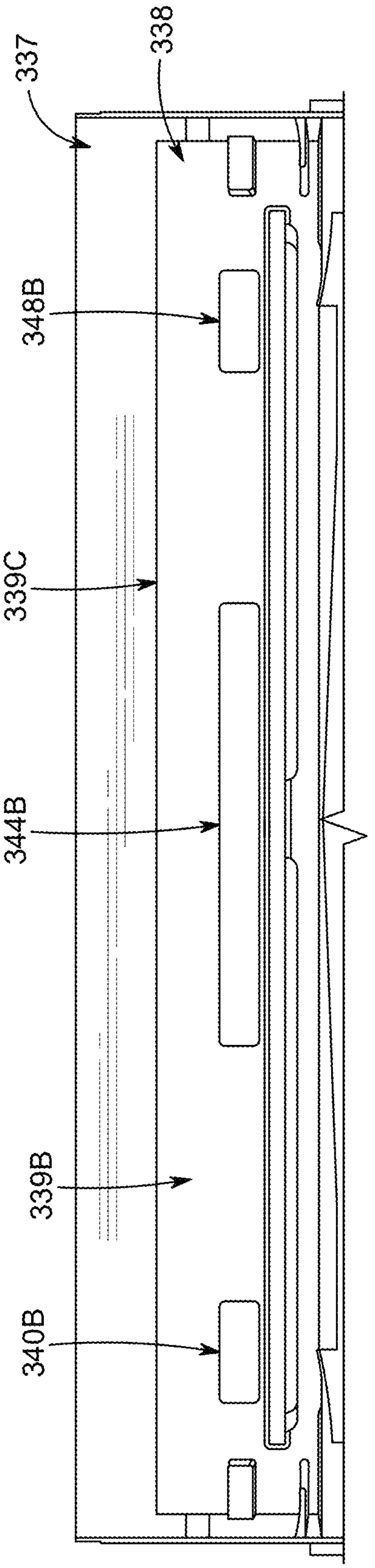
FIG. 19 is a top view of the turbine shroud assembly of FIG. 17, showing the three cooling air plenums and the plurality of cooling air passageways formed in the aft support wall.

Another embodiment of a turbine shroud assembly 326 according to a further aspect of the present disclosure is shown in FIGS. 17-19. The turbine shroud assembly 326 is similar to the turbine shroud assemblies 26, 126, 226 shown in FIGS. 2-16 and described herein. Accordingly, similar reference numbers in the 300 series indicate features that are common between the turbine shroud assembly 326 and the turbine shroud assemblies 26, 126, 226. The descriptions of the turbine shroud assemblies 26, 126, 226 are incorporated by reference to apply to the turbine shroud assembly 326, except in instances when they conflict with the specific descriptions and the drawings of the turbine shroud assembly 326.

The turbine shroud assembly 326 is similar to the turbine shroud assemblies 26, 126, 226, in particular including a carrier segment 330 and blade track segment 370. The carrier segment 330 includes an aft support wall 336 with three cooling air plenums 340A, 344A, 348A formed therein. The turbine shroud assembly 326 differs from the turbine shroud assemblies 26, 126, 226 in that the carrier segment 330 does not include cooling air passageways that open at the radially inwardly-facing surface 339B or the axially aft-facing surfaces 336A, 339C, but instead includes additional, second cooling air plenums 340B, 344B, 348B formed in the aft support wall 336 radially inwardly and spaced apart from the first cooling air plenums 340A, 344A, 348A.

As can be seen in FIGS. 17-19, the second cooling air plenums 340B, 344B, 348B are arranged on the second, radially inward end of the aft support wall 336 and open radially inwardly proximate to the aft flange 376 of the shroud wall 374 of the blade track segment 370. Each second cooling air plenum 340B, 344B, 348B is in fluid communication with a respective one of the first cooling air plenums 340A, 344A, 348A such that cooling air 399 can flow from the first cooling air plenums 340A, 344A, 348A, through the second cooling air plenums 340B, 344B, 348B, and exit the second cooling air plenums 340B, 344B, 348B so as to direct the cooling air 399 onto a radially outwardly-facing surface 377 of the aft flange 376 in order to cool the aft flange 376.

Illustratively, as can be seen in FIG. 18 and FIG. 19, the second cooling air plenums 340B, 344B, 348B are formed to be the same size, in particular having the same axial and radial extents. This sizing allows for the same amount of cooling air 399 to enter and exit at least the circumferentially outer second cooling air plenums 340B, 348B, thus ensuring even cooling from the second cooling air plenums 340B, 348B. A person skilled in the art will understand that the second cooling air plenums 340B, 344B, 348B can be formed to have different axial, radial, and circumferential extents based on the desired cooling effect in particular areas of the aft flange 376. For example, in some embodiments, the second cooling air plenums 340B, 344B, 348B may have a smaller axial extent than the first cooling air plenums 340A, 344A, 348A so as to more focus the cooling air 399 on the area on the aft flange 376 directly beneath (radially inwardly) the second cooling air plenums 340B, 344B, 348B.

As can be seen in FIG. 18, the first and second cooling air plenums 340A, 344A, 348A, 340B, 344B, 348B are fluidically connected to each other via a plurality of cooling air passageways 354, 356, 358, 360, 362, 364. Specifically, the first cooling air plenums 340A, 344A, 348A each include a bottom surface 340A1, 344A1, 348A1 and the second cooling air plenums 340B, 344B, 348B each include a top surface 340B1, 344B1, 348B1. The bottom surfaces 340A1, 344A1, 348A1 are radially spaced apart from the top surfaces 340B1, 344B1, 348B1. The cooling air passageways 354, 356, 358, 360, 362, 364 extend between the bottom surfaces 340A1, 344A1, 348A1 and the top surfaces 340B1, 344B1, 348B1 so as to fluidically interconnect the first and second cooling air plenums 340A, 344A, 348A, 340B, 344B, 348B.

Illustratively, the first and second cooling air plenums 340A, 340B located in a first circumferential end of the aft support wall 336 are fluidically connected via a single cooling air passageway 362, the first and second cooling air plenums 340A, 340B located centrally in the aft support wall 336 are fluidically connected via four cooling air passageways 354, 356, 358, 360, and the first and second cooling air plenums 340A, 340B located in a second circumferential end of the aft support wall 336 opposite the first circumferential end are fluidically connected via a single cooling air passageway 364. A person skilled in the art will understand that more or fewer cooling air passageways per pair of cooling air plenums.

In operation, the cooling air 399 exiting the second cooling air plenums 340B, 344B, 348B flows onto a radially outwardly-facing surface 377 of the aft flange 376, thus providing cooling to the aft flange 376. As a result, at least the portion 377A (see FIG. 17) of the aft flange 376 is cooled by the cooling air 399 exiting the second cooling air plenums 340B, 344B, 348B. A person skilled in the art will understand that the portions of the aft support wall 336, the aft support wall flange 338, and the blade track segment 370 that can be cooled by the second cooling air plenums 340B, 344B, 348B may include areas outside of the portion 377A (i.e., the support wall 336 itself via the first and second cooling air plenums 340A, 344A, 348A, 340B, 344B, 348B extending therethrough, or a portion of the cooling air 399 flowing axially aft beyond the portion 377A and cooling an underside 339B of the aft support wall flange 338) as the portion 377A is merely shown to illustrate areas that can be cooled by the second cooling air plenums 340B, 344B, 348B.

Another embodiment of a turbine shroud assembly 426 according to a further aspect of the present disclosure is shown in FIGS. 20-27B. The turbine shroud assembly 426 is similar to the turbine shroud assemblies 26, 126, 226, 326 shown in FIGS. 2-19 and described herein. Accordingly, similar reference numbers in the 400 series indicate features that are common between the turbine shroud assembly 426 and the turbine shroud assemblies 26, 126, 226, 326. The descriptions of the turbine shroud assemblies 26, 126, 226, 326 are incorporated by reference to apply to the turbine shroud assembly 426, except in instances when they conflict with the specific descriptions and the drawings of the turbine shroud assembly 426.

The turbine shroud assembly 426 is similar to the turbine shroud assembly 326, in particular including a carrier segment 430 and blade track segment 470. The carrier segment 430 includes an aft support wall 436 with three cooling air plenums 440A, 444A, 448A formed therein. The turbine shroud assembly 426 also includes second cooling air plenums 440B, 444B, 448B formed in the aft support wall 436 radially inwardly and spaced apart from the first cooling air plenums 440A, 444A, 448A. The second cooling air plenums 440B, 444B, 448B can be formed the same as the second cooling air plenums 340B, 344B, 348B of FIGS. 17-19, and can be interconnected via cooling air passageways 454, 456, 458, 460, 462, 464 in the same manner as well.

The turbine shroud assembly 426 differs from the turbine shroud assembly 326 in that cooling plates 480, 484, 488 can be arranged at a radially inner end of the opening of each of the second cooling air plenums 440B, 444B, 448B. Each of the cooling plates 480, 484, 488 includes at least one cooling air conduit 482, 486, 490 formed therethrough that conducts cooling air 499 from the second cooling air plenum 440B, 444B, 448B, through the at least one cooling air conduit 482, 486, 490, and directs the cooling air 499 onto the radially outwardly-facing surface 477 of the aft flange 476.

Figure 21:
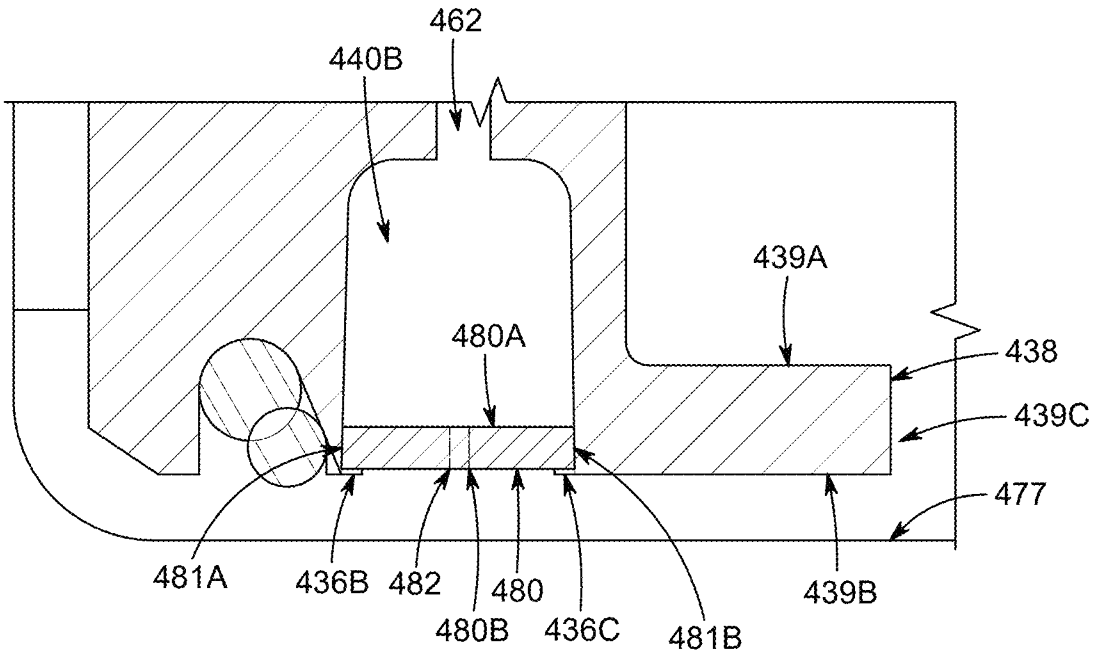
FIG. 21 is a side cross-sectional view of the turbine shroud assembly of FIG. 20, showing the second cooling air plenum and the cooling plate.
Figure 22:
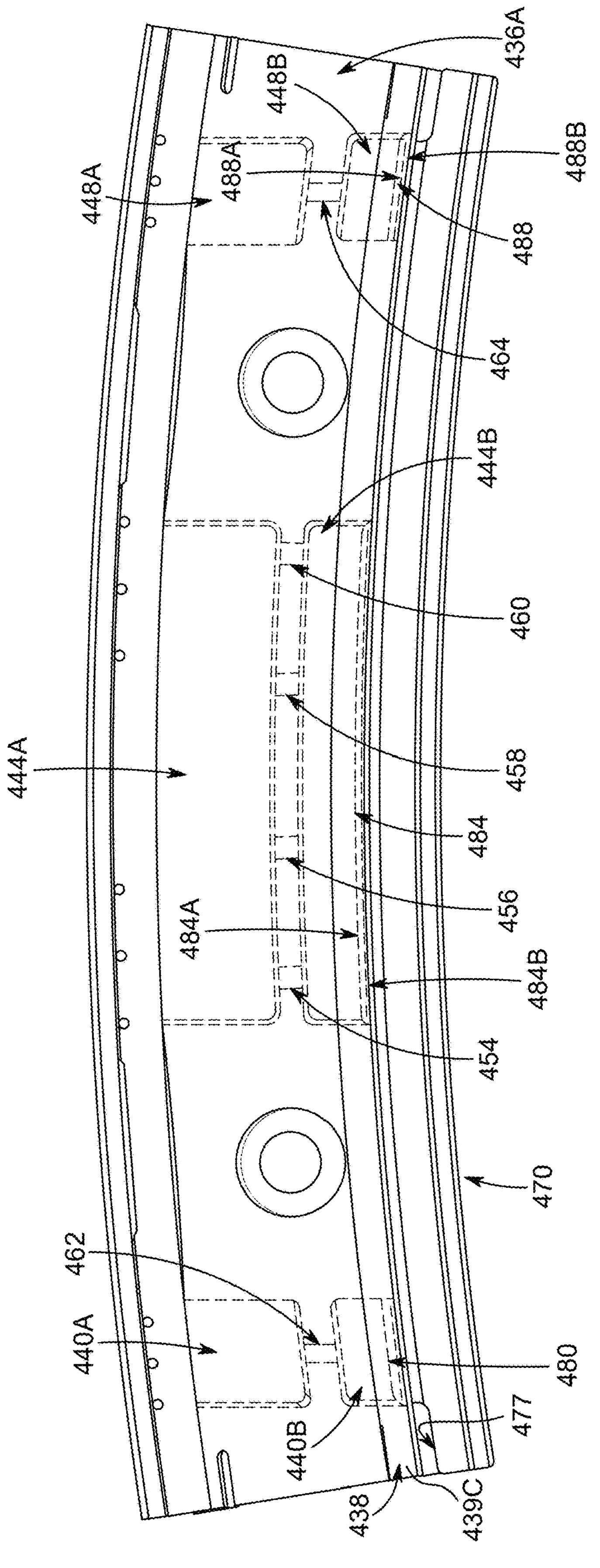
FIG. 22 is an axially forward-facing view of the turbine shroud assembly of FIG. 20, showing that the carrier segment includes three cooling air plenums and a plurality of cooling air passageways formed in the aft support wall.
Figure 23:
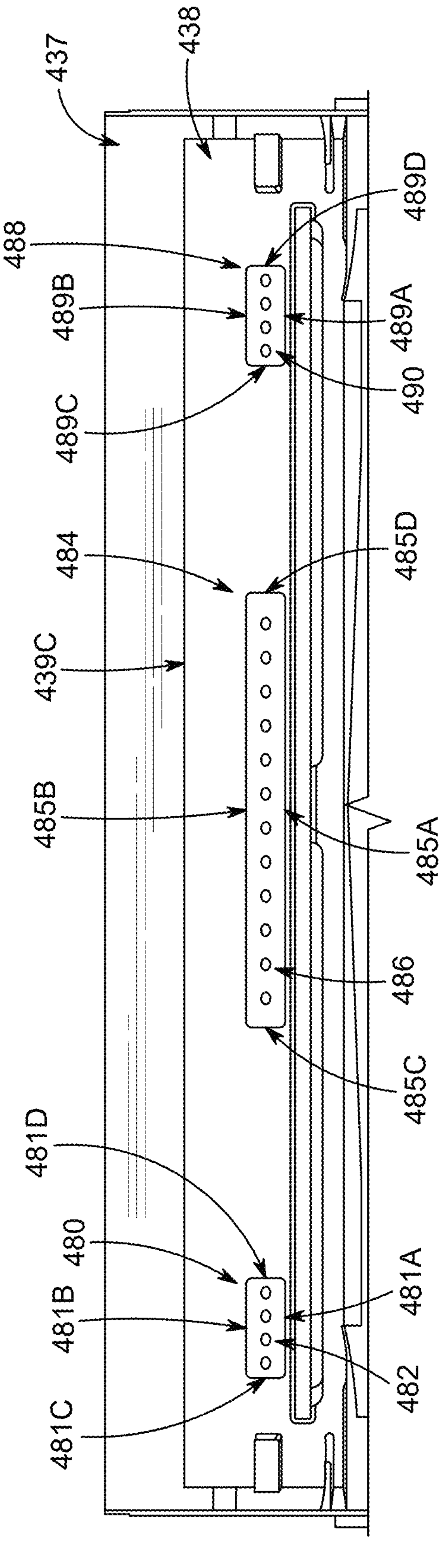
FIG. 23 is a top view of the turbine shroud assembly of FIG. 20, showing the three cooling air plenums and the plurality of cooling air passageways formed in the aft support wall.

As can be seen in FIGS. 21-23, each cooling plate 480, 484, 488 includes an outer perimeter surface which includes axially forward and aft surfaces 481A, 481B, 485A, 485B, 489A, 489B and opposing circumferential surfaces 481C, 481D, 485C, 485D, 489C, 489D that extend around the cooling plate 480, 484, 488. Each cooling plate 480, 484, 488 also includes a radially outwardly-facing surface 480A, 484A, 488A and a radially inwardly-facing surface 480B, 484B, 488B opposite the radially outer surface 480A, 484A, 488A. As shown in FIG. 21, the radially inwardly-facing surface 480B, 484B, 488B of each cooling plate 480, 484, 488 can be arranged on and rest on small flanges 436B, 436C that extend away from opposing axially-facing inner surfaces of the second cooling air plenums 440B, 444B, 448B at a radially inner end of the axially-facing inner surfaces.

Illustratively, the axially forward and aft surfaces 481A, 481B, 485A, 485B, 489A, 489B and opposing circumferential surfaces 481C, 481D, 485C, 485D, 489C, 489D of each plate 480, 484, 488 contact the corresponding inner surfaces of the second cooling air plenums 440B, 444B, 448B so as to seal the cooling plate 480, 484, 488 relative to the second cooling air plenum 440B, 444B, 448B such that the cooling air 499 only passes through the at least one cooling air conduit 482, 486, 490. In some embodiments, the radially inwardly-facing surface 480B, 484B, 488B is flush with the radially inwardly-facing surface 439B of the aft support wall 436.

Illustratively, as shown in FIG. 23, the cooling plates 480, 488 arranged in the circumferentially outer second cooling air plenums 440B, 448B each include four cooling air conduits 482, 490, and the cooling plate 484 arranged in the central second cooling air plenum 444B includes twelve cooling air conduits 486. The cooling air conduits 482, 486, 490 each extend from the radially outwardly-facing surface 480A, 484A, 488A of the cooling plate 482, 486, 490 to the radially inwardly-facing surface 480B, 484B, 488B. A person skilled in the art will understand that more or fewer cooling air conduits may be formed in the plates based on the desired cooling to be provided to the aft flange 476.

FIGS. 24A-27B show examples of configurations of the cooling air conduits in the cooling plates that can be used in any of the cooling plates 480, 484, 488 described above. FIGS. 24A-27B only show one of the smaller cooling plates 480, 488 that include four cooling air conduits, but the same configurations can apply to the larger central cooling plate 484.

Figure 24B:
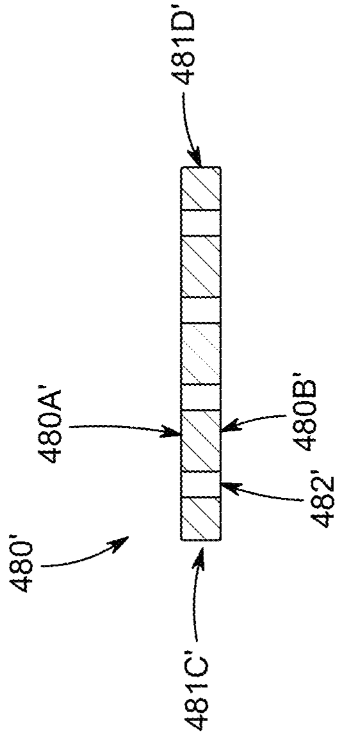
FIG. 24B is a side cross-sectional view of the first cooling plate of FIG. 24A, showing that the four air conduits extend radially through the plate.
Figure 24A:
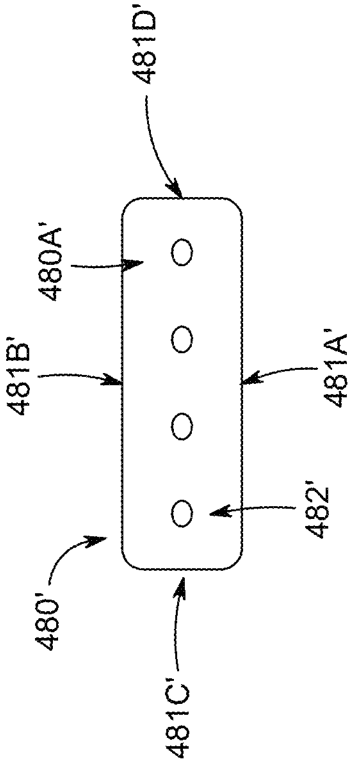
FIG. 24A is a top view of a first cooling plate that can be arranged in the second cooling air plenum of the aft support wall of FIG. 20, showing that the cooling plate includes four air conduits.

FIG. 24A and FIG. 24B show a top view and a side cross-sectional view, respectively, of a first cooling plate 480' in which the four cooling air conduits 482' extend entirely radially not at an angle. The four cooling air conduits 482' are evenly spaced apart in the circumferential direction (i.e., from the surface 481C' to the surface 481D').

Figure 25B:
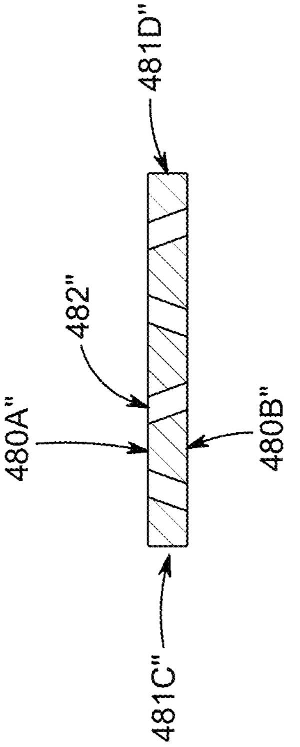
FIG. 25B is a side cross-sectional view of the second cooling plate of FIG. 25A, showing that the four air conduits extend at an angle radially through the plate, and that the conduits alternate in the orientation of the angle.
Figure 25A:
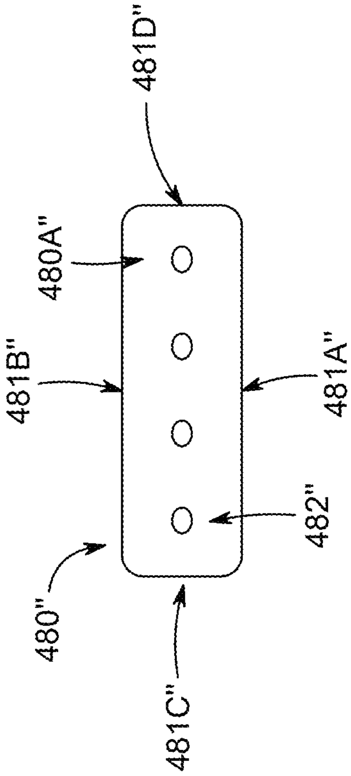
FIG. 25A is a top view of a second cooling plate that can be arranged in the second cooling air plenum of the aft support wall of FIG. 20, showing that the cooling plate includes four air conduits.

FIG. 25A and FIG. 25B show a top view and a side cross-sectional view, respectively, of a second cooling plate 480" in which the four cooling air conduits 482" extend at alternating angles. For example, as can be seen in FIG. 25B, the cooling air conduit 482" closest to the surface 481C" extends at a first angle, the adjacent cooling air conduit 482" (in a direction toward the 481D") extends at a second angle opposite the first angle, the next adjacent cooling air conduit 482" (in a direction toward the 481D") extends at the first angle, and the next adjacent cooling air conduit 482" (in a direction toward the 481D") extends at the second angle. The four cooling air conduits 482" are evenly spaced apart in the circumferential direction (i.e., from the surface 481C" to the surface 481D").

Figure 26B:
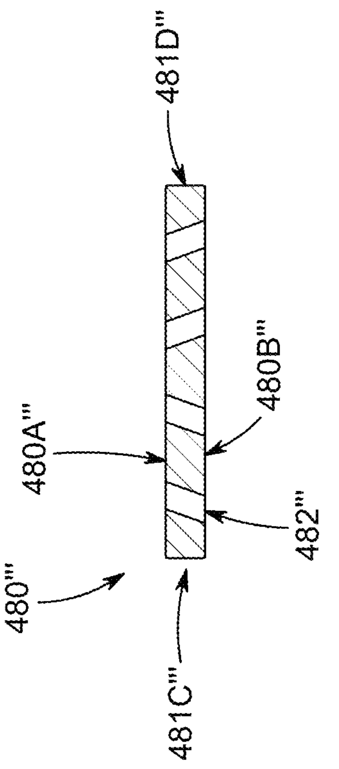
FIG. 26B is a side cross-sectional view of the third cooling plate of FIG. 26A, showing that the four air conduits extend at an angle radially through the plate, and that the first two conduits extend at angles opposite of the angles of the third and fourth conduits.
Figure 26A:
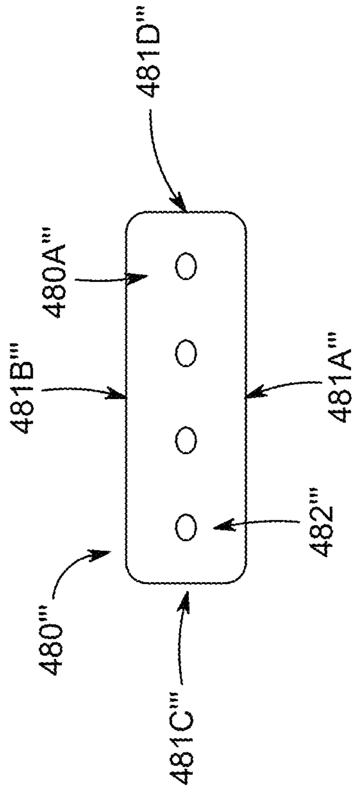
FIG. 26A is a top view of a third cooling plate that can be arranged in the second cooling air plenum of the aft support wall of FIG. 20, showing that the cooling plate includes four air conduits.

FIG. 26A and FIG. 26B show a top view and a side cross-sectional view, respectively, of a third cooling plate 480''' in which the four cooling air conduits 482''' extend in a fanned pattern in which the conduits 482''' on one half of the plate 480''' towards the surface 481C''' extend at a first angle and the conduits 482''' on the other half of the plate 480''' towards the surface 481D''' extend at a second angle opposite the first angle. The four cooling air conduits 482''' are evenly spaced apart in the circumferential direction (i.e., from the surface 481C''' to the surface 481D''').

Figure 27B:
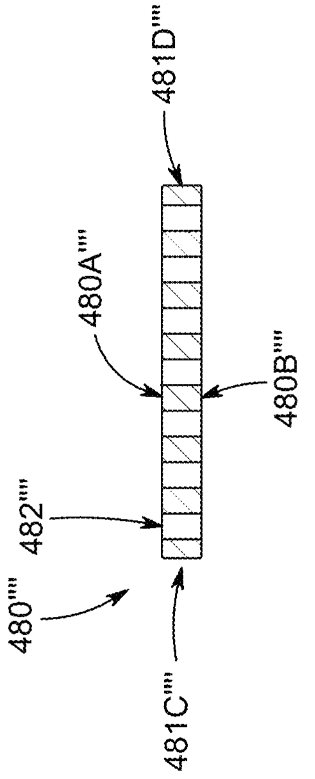
FIG. 27B is a side cross-sectional view of the fourth cooling plate of FIG. 27A, showing that the four air conduits extend radially through the plate.
Figure 27A:
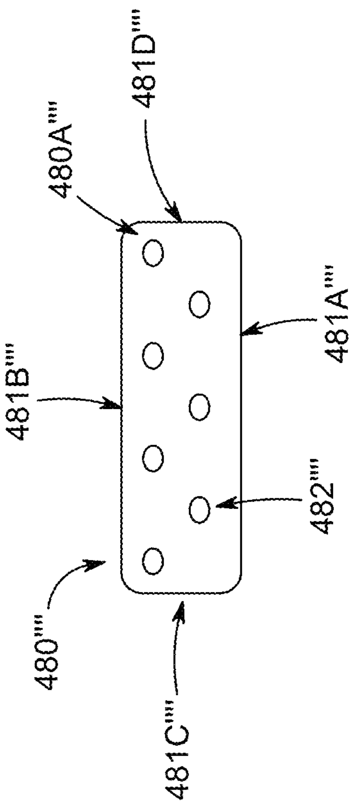
FIG. 27A is a top view of a fourth cooling plate that can be arranged in the second cooling air plenum of the aft support wall of FIG. 20, showing that the cooling plate includes seven air conduits.

FIG. 27A and FIG. 27B show a top view and a side cross-sectional view, respectively, of a fourth cooling plate 480"" in which seven cooling air conduits 482"" extend entirely radially through the plate 480"". The cooling air conduits 482"" are staggered in that four can be arranged closer to the surface 481B"" and three are arranged closer to the surface 481A"". The four cooling air conduits 482"" are evenly spaced apart in the circumferential direction (i.e., from the surface 481C"" to the surface 481D"").

Figure 20:
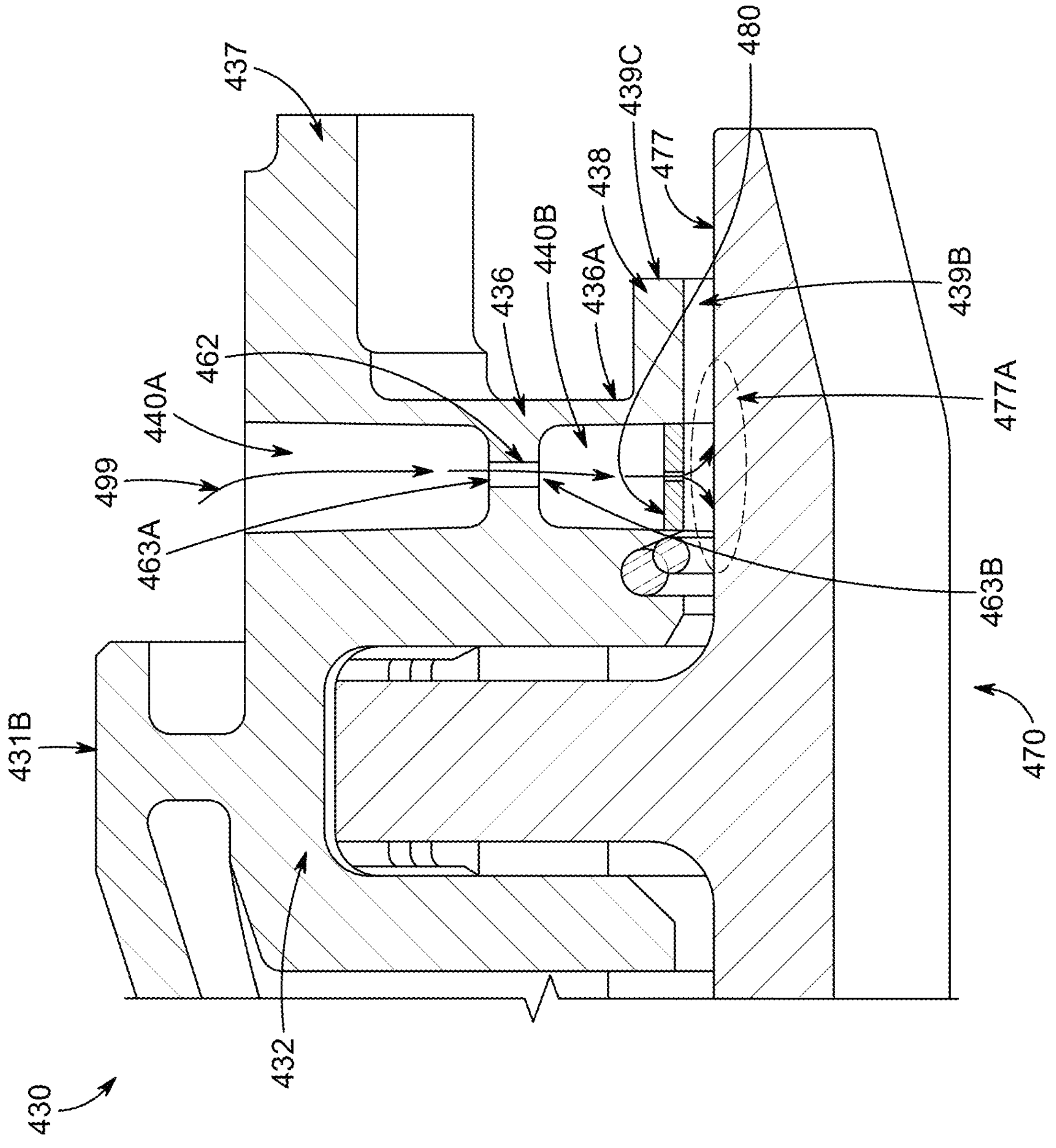
FIG. 20 is a side cross-sectional view of a turbine shroud assembly according to a further aspect of the present disclosure, showing that the aft support wall of the carrier segment includes an aft support wall flange, and that the aft support wall includes first cooling air plenums formed radially outwardly in the aft support wall and second cooling air plenums formed radially inwardly in the aft support wall and spaced apart from the first cooling air plenums and fluidically connected thereto, and showing that a cooling plate is arranged at a radially inner end of the second cooling air plenum such that the cooling air is directed through air conduits formed in the plate so as to cool the aft flange of the blade track segment.

In operation, as can be seen in FIG. 20, the cooling air 499 flows through the first cooling air plenum 440A, 444A, 448A, through the cooling air passageway 454, 456, 458, 460, 462, 464, and then through the second cooling air plenum 540B, 544B, 548B. The cooling air 499 then flows through the cooling air conduits 482, 486, 490 formed in the cooling plates 480, 484, 488 so as to cool the radially outwardly-facing surface 477 of the aft flange 476, in particular at least in the region of the portion 477A.

It is noted that the cooling air passageways 454, 456, 458, 460, 462, 464 and/or the cooling air conduits 482, 486, 490 of the cooling plates 480, 484, 488 can be sized with respect to each other in order to achieve desired properties of the cooling air 499 passing from the passageways 454, 456, 458, 460, 462, 464, through the second air plenums 440B 444B, 448B, and then exiting the conduits 482, 486, 490, such as, for example, achieved a desired velocity of cooling air 499, area coverage of cooling air 499, angle of contact of cooling air 499, and other similar parameters related to cooling effectiveness.

For example, the cooling air passageways 454, 456, 458, 460, 462, 464 shown in FIG. 21 can be sized to have a total area (i.e., area of their inlet and outlet openings) that is larger, smaller, or equivalent to a total area (i.e., area of their inlet and outlet openings) of the cooling air conduits 482, 486, 490 of the cooling plates 480, 484, 488 so as to adjust the cooling effectiveness of the cooling air 499. In other designs, the total volumes of each of the passageways 454, 456, 458, 460, 462, 464 and the cooling air conduits 482, 486, 490 can be considered in the design so as to adjust the cooling effectiveness of the cooling air 499.

Figure 28:
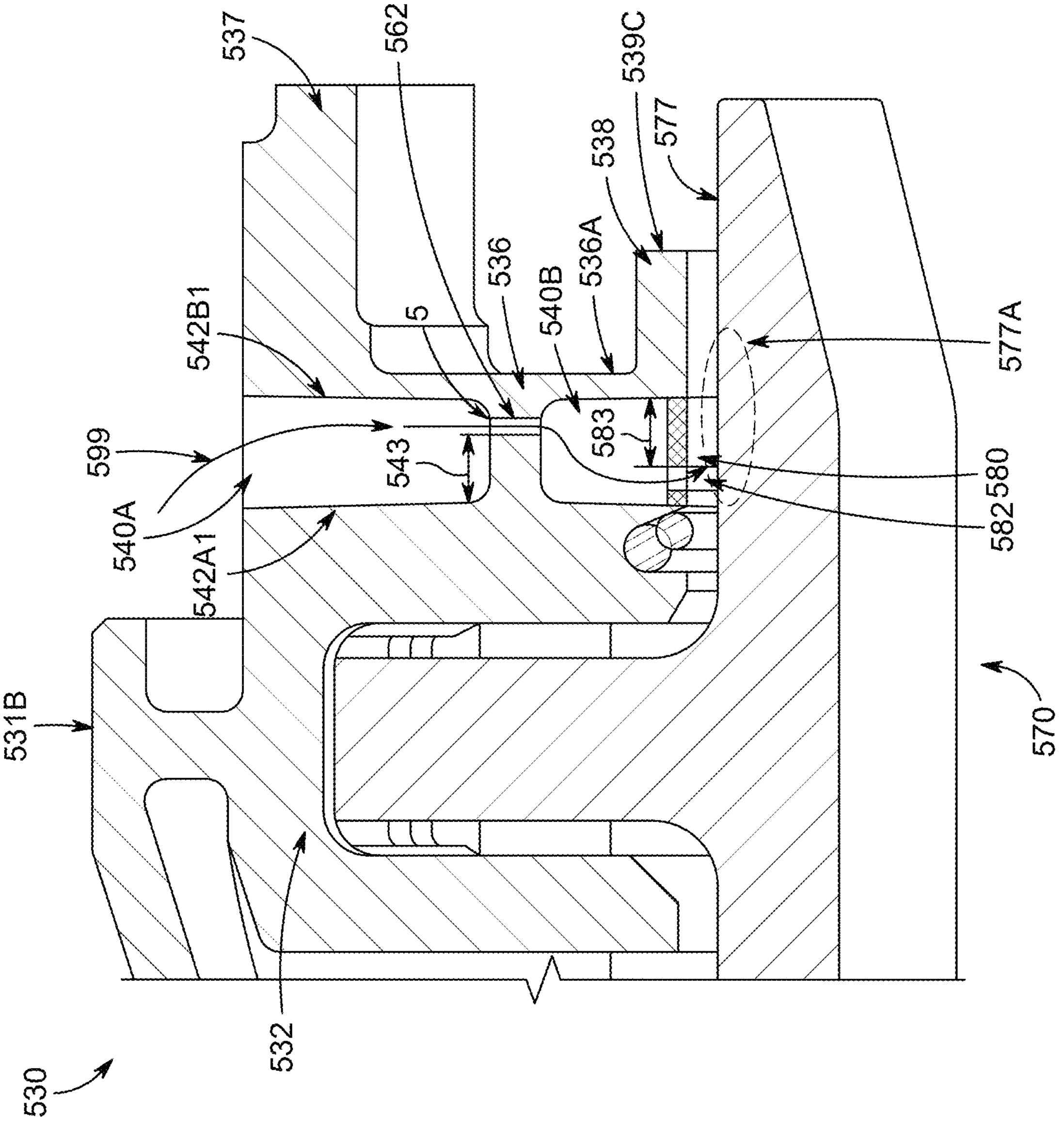
FIG. 28 is a side cross-sectional view of a turbine shroud assembly according to a further aspect of the present disclosure, showing that the aft support wall of the carrier segment includes an aft support wall flange, and that the aft support wall includes first cooling air plenums formed radially outwardly in the aft support wall and second cooling air plenums formed radially inwardly in the aft support wall and spaced apart from the first cooling air plenums and fluidically connected thereto, and showing that a cooling plate is arranged at a radially inner end of the second cooling air plenum such that the cooling air is directed through a slot formed in the plate so as to cool the aft flange of the blade track segment.
Figure 29B:
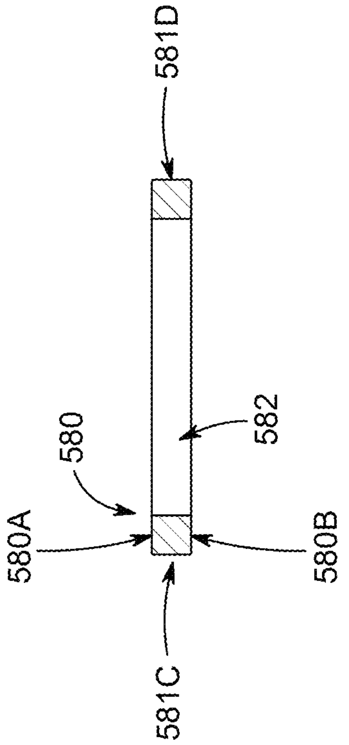
FIG. 29B is a side cross-sectional view of the first cooling plate of FIG. 29A, showing that the slot.

Another embodiment of a turbine shroud assembly 526 according to a further aspect of the present disclosure is shown in FIGS. 28-29B. The turbine shroud assembly 526 is similar to the turbine shroud assemblies 26, 126, 226, 326, 426 shown in FIGS. 2-27B and described herein. Accordingly, similar reference numbers in the 500 series indicate features that are common between the turbine shroud assembly 526 and the turbine shroud assemblies 26, 126, 226, 326, 426. The descriptions of the turbine shroud assemblies 26, 126, 226, 326, 426 are incorporated by reference to apply to the turbine shroud assembly 526, except in instances when they conflict with the specific descriptions and the drawings of the turbine shroud assembly 526.

The turbine shroud assembly 526 is similar to the turbine shroud assembly 426, in particular including a carrier segment 530 and blade track segment 570. The carrier segment 530 includes an aft support wall 536 with three cooling air plenums 540A, 544A, 548A formed therein. The turbine shroud assembly 526 also includes second cooling air plenums 540B, 544B, 548B formed in the aft support wall 536 radially inwardly and spaced apart from the first cooling air plenums 540A, 544A, 548A. The second cooling air plenums 540B, 544B, 548B can be formed the same as the second cooling air plenums 340B, 344B, 348B, 440B, 444B, 448B of FIGS. 17-23, and can be interconnected via cooling air passageways (e.g., cooling air passageway 562) in the same manner as well.

Figure 29A:
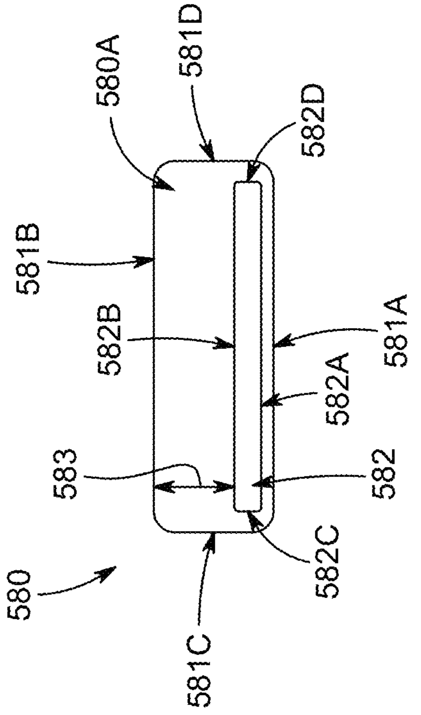
FIG. 29A is a top view of the cooling plate that can be arranged in the second cooling air plenum of the aft support wall of FIG. 28, showing that the cooling plate includes a single slot arranged on one side of the plate.

The turbine shroud assembly 526 differs from the turbine shroud assembly 426 in that the cooling plates (e.g., cooling plate 580) include elongated slots 582 as opposed to circular and cylindrical cooling air conduits. As can be seen in FIG. 29A, the elongated slot 582 of a first cooling plate 580 extends along a majority of the circumferential extent (i.e., from the surface 581C to the surface 581D) of the plate 580 and is located a first axial distance 583 from the axially aft surface 581B.

As shown in FIG. 28, each cooling air passageway (e.g., cooling air passageway 562) extends from the bottom surface 540A1 of the first cooling air plenum 540A to the top surface 540B1. Illustratively, the cooling air passageways 562 are all located on an axial side of the bottom and top surfaces 540A1, 540B1 opposite the axial side on which the elongated slot 582 is arranged when the cooling plate 580 is arranged in the second cooling air plenum 540B. For example, as shown in FIG. 28, the cooling plate 580 is arranged such that the slot 582 is located on an axially forward side of the cooling air plenum 540B (i.e., the slot 582 is located closer to the forward side 581A, and the cooling air passageway 562 is formed closer to the axially aft side wall 542B1 than the axially forward side wall 542A1. Specifically, the cooling air passageway 562 is formed a second axial distance 543 away from the axially forward side wall 542A1. In some embodiments, the first axial distance 583 is equal to the second axial distance 543.

In operation, the cooling air 599 flows through the first cooling air plenum 540A, through the cooling air passageway 562, and then through the second cooling air plenum 540B. As can be seen in FIG. 28, the cooling air 599 flows axially forward toward the elongated slot 582 and then through the slot 582. The flow curving in this manner prior to exiting the elongated slot 582 improves the flow such that the cooling air 599 effectively contacts the radially outwardly-facing surface 577 in the region of the portion 577A. Specifically, in at least some configurations, the flow is improved in that the flow does not extend straight through the plenums 540A, 540B and the cooling air passageway 562 to reach the aft flange 576, thus providing a low effectiveness cooling. Offsetting passageway 562 and the slot 582, as well as providing the separate plenum 540B, allows for a pressure drop across the passageway 562, which allows for a lower pressure drop across the slot 582 as well. This improves the flow of the cooling air 599 onto the aft flange 576. Additionally, in some embodiments, the slot 582 is forward on the cooling plate 580 so as to align the slot 582 with a particularly hot region of the shroud wall 574, thus providing an efficient use of the cooling air 599.

It is noted that the cooling air passageways (e.g., cooling air passageway 562) and/or the slots (e.g., slots 582) can be sized with respect to each other in order to achieve desired properties of the cooling air 599 passing from the passageways (e.g., cooling air passageway 562), through the second air plenums 540B 544B, 548B, and then exiting the slots (e.g., slots 582), such as, for example, achieved a desired velocity of cooling air 599, area coverage of cooling air 599, angle of contact of cooling air 599, and other similar parameters related to cooling effectiveness.

For example, the cooling air passageway 562 shown in FIG. 28 can be sized to have a total area (i.e., area of the inlet and outlet opening) that is larger, smaller, or equivalent to a total area (i.e., area of the inlet and outlet opening) of the slots 582 of the cooling plate 580 so as to adjust the cooling effectiveness of the cooling air 599. In other designs, the total volumes of the passageway 562 and the slot 582 can be considered in the design so as to adjust the cooling effectiveness of the cooling air 599.

Although the cooling air plenums and passageways described in the present disclosure are described as providing cooling to various portions of the turbine shroud assembly (i.e., the blade track segment and the aft support wall flange), the cooling air provided by the cooling air plenums and passageways may also be directed into damping plenums formed in a vane assembly axially aft of and adjacent to the turbine shroud assembly. For example, in some non-limiting embodiments, the cooling air exiting the passageways that exit at the radially inwardly-facing surface 39B or the passageways that exit at the axially aft-facing surface 139C, 239C may flow into damping plenums formed in portions of the vane assembly located adjacent the aft support wall and/or the aft support wall flange, thus providing damping properties to the vane assembly. Additional details of the vane assemblies and the damping plenums, in particular how these components may utilize the cooling air plenums and cooling air passageways described herein, may be found in U.S. application. Ser. No. 19/346,469 entitled "TURBINE SHROUD AND VANE ASSEMBLY WITH DAMPING PLENUM," filed on Sep. 30, 2025, which is incorporated by reference herein in its entirety.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud assembly for use with a gas turbine engine, the turbine shroud assembly comprising a blade track segment made of ceramic matrix composite materials and arranged circumferentially at least partway around an axis to define a portion of a gas path of the turbine shroud assembly, the blade track segment having a shroud wall that extends circumferentially partway around the axis, and a carrier segment made of metallic materials that supports the blade track segment to locate the blade track segment radially outward of the axis and arranged circumferentially at least partway around the axis, the carrier segment including an outer wall, a forward support wall that extends radially inward from the outer wall, and an aft support wall that extends radially inward from the outer wall that is located axially aft of the forward support wall, the aft support wall including at least one axially aft-facing surface, wherein the carrier segment further includes at least one cooling air plenum formed in the aft support wall and at least one cooling air passageway in fluid communication with and extending away from the at least one cooling air plenum through the aft support wall, the at least one cooling air passageway opening at the at least one axially aft-facing surface of the aft support wall so as to conduct cooling air through the carrier segment and direct the cooling air out of the carrier segment so as to cool at least one portion of the aft support wall.

2. The turbine shroud assembly of claim 1, wherein the aft support wall includes a main wall having a first end connected to the outer wall and a second end opposite of and radially spaced apart from the first end, and wherein the at least one axially aft-facing surface is a first axially aft-facing surface of the main wall.

3. The turbine shroud assembly of claim 2, wherein the at least one cooling air passageway includes an outlet opening formed in the first axially aft-facing surface of the main wall of the aft support wall.

4. The turbine shroud assembly of claim 3, wherein the aft support wall further includes an aft support wall flange that extends axially aft away from the first axially aft-facing surface of the main wall at the second end of the main wall, and wherein the cooling air directed out of the outlet opening of the at least one cooling air passageway flows onto a radially outwardly-facing surface of the aft support wall flange so as to cool the aft support wall flange.

5. The turbine shroud assembly of claim 4, wherein the at least one cooling air passageway extends at least partially radially inwardly from the at least one cooling air plenum to the outlet opening formed in the first axially aft-facing surface of the main wall of the aft support wall such that the cooling air is directed at least partially radially inwardly as it exits the outlet opening and towards the radially outwardly-facing surface of the aft support wall flange.

6. The turbine shroud assembly of claim 5, wherein the at least one cooling air passageway includes an inlet opening formed in a side wall or a bottom surface of the at least one cooling air plenum, and wherein the inlet opening is located axially forward of the outlet opening such that the at least one cooling air passageway extends at an angle relative to the axis.

7. The turbine shroud assembly of claim 6, wherein the at least one cooling air passageway includes a plurality of cooling air passageways that each include an outlet opening formed in the first axially aft-facing surface of the main wall of the aft support wall, and wherein each outlet opening of the plurality of cooling air passageways is circumferentially spaced apart from adjacent outlet openings of the plurality of cooling air passageways.

8. The turbine shroud assembly of claim 7, wherein the at least one cooling air plenum includes a plurality of cooling air plenums, and wherein a first cooling air passageway of the plurality of cooling air passageways extends from a first cooling air plenum of the plurality of cooling air plenums and a second cooling air passageway of the plurality of cooling air passageways extends from a second cooling air plenum of the plurality of cooling air plenums.

9. The turbine shroud assembly of claim 2, wherein the aft support wall further includes an aft support wall flange that extends axially aft away from the first axially aft-facing surface of the main wall at the second end of the main wall, and wherein an axially aft end of the aft support wall flange includes a second axially aft-facing surface that is axially spaced apart from the first axially aft-facing surface in an axially aft direction, and wherein the at least one cooling air passageway extends through the aft support wall flange and includes an outlet opening formed in the second axially aft-facing surface such that the cooling air flows through the aft support wall flange so as to cool the aft support wall flange.

10. The turbine shroud assembly of claim 9, wherein the at least one cooling air passageway includes a first portion that extends at least partially radially inwardly from and is in fluid communication with the at least one cooling air plenum and a second portion that extends at least partially axially from and is in fluid communication with the first portion and to the outlet opening formed in the second axially aft-facing surface of the aft support wall flange.

11. The turbine shroud assembly of claim 10, wherein the first portion of the at least one cooling air passageway extends in a radial direction and the second portion of the at least one cooling air passageway extends in an axial direction such that an orthogonal angle is formed at a junction between the first and second portions.

12. The turbine shroud assembly of claim 11, wherein the at least one cooling air passageway includes a plurality of cooling air passageways that each include an outlet opening formed in the second axially aft-facing surface of the aft support wall flange of the aft support wall, and wherein each outlet opening of the plurality of cooling air passageways is circumferentially spaced apart from adjacent outlet openings of the plurality of cooling air passageways.

13. The turbine shroud assembly of claim 12, wherein the at least one cooling air plenum includes a plurality of cooling air plenums, and wherein a first cooling air passageway of the plurality of cooling air passageways extends from a first cooling air plenum of the plurality of cooling air plenums and a second cooling air passageway of the plurality of cooling air passageways extends from a second cooling air plenum of the plurality of cooling air plenums.

14. A turbine shroud assembly for use with a gas turbine engine, the turbine shroud assembly comprising a blade track segment arranged circumferentially at least partway around an axis, the blade track segment having a shroud wall that extends circumferentially partway around the axis, the shroud wall including an aft flange at an aft end of the shroud wall, and a carrier segment that supports the blade track segment and is arranged circumferentially at least partway around the axis, the carrier segment including an aft support wall, the aft support wall including at least one axially aft-facing surface, wherein the carrier segment further includes a cooling air plenum formed in the aft support wall and a cooling air passageway in fluid communication with and extending away from the cooling air plenum, the cooling air passageway opening at the at least one axially aft-facing surface of the aft support wall so as to cool at least one portion of the aft support wall.

15. The turbine shroud assembly of claim 14, wherein the aft support wall includes a main wall, wherein the at least one axially aft-facing surface is a first axially aft-facing surface of the main wall, and wherein the at least one cooling air passageway includes an outlet opening formed in the first axially aft-facing surface of the main wall of the aft support wall.

16. The turbine shroud assembly of claim 15, wherein the at least one cooling air passageway extends at least partially radially inwardly from the at least one cooling air plenum to the outlet opening formed in the first axially aft-facing surface of the main wall of the aft support wall such that the cooling air is directed at least partially radially inwardly as it exits the outlet opening.

17. The turbine shroud assembly of claim 14, wherein the aft support wall includes a main wall, wherein the at least one axially aft-facing surface is a first axially aft-facing surface of the main wall, wherein the aft support wall further includes an aft support wall flange that extends axially aft away from the first axially aft-facing surface of the main wall, wherein an axially aft end of the aft support wall flange includes a second axially aft-facing surface that is axially spaced apart from the first axially aft-facing surface in an axially aft direction, and wherein the at least one cooling air passageway extends through the aft support wall flange and includes an outlet opening formed in the second axially aft-facing surface.

18. The turbine shroud assembly of claim 17, wherein the at least one cooling air passageway includes a first portion that extends at least partially radially inwardly from and is in fluid communication with the at least one cooling air plenum and a second portion that extends at least partially axially from and is in fluid communication with the first portion and to the outlet opening formed in the second axially aft-facing surface of the aft support wall flange.

19. The turbine shroud assembly of claim 14, wherein the at least one cooling air passageway includes a plurality of cooling air passageways that each include an outlet opening formed in the at least one axially aft-facing surface of the aft support wall, and wherein each outlet opening of the plurality of cooling air passageways is circumferentially spaced apart from adjacent outlet openings of the plurality of cooling air passageways.

20. A method, comprising arranging a blade track segment made of ceramic matrix composite materials and arranged circumferentially at least partway around an axis to define a portion of a gas path of a turbine shroud assembly, the blade track segment having a shroud wall that extends circumferentially partway around the axis, arranging a carrier segment made of metallic materials circumferentially at least partway around the axis, the carrier segment supporting the blade track segment to locate the blade track segment radially outward of the axis, the carrier segment including an outer wall, a forward support wall that extends radially inward from the outer wall, and an aft support wall that extends radially inward from the outer wall that is located axially aft of the forward support wall, the aft support wall including at least one axially aft-facing surface, forming at least one cooling air plenum in the aft support wall of the carrier segment, and forming at least one cooling air passageway in the carrier segment, the at least one cooling air passageway being in fluid communication with and extending away from the at least one cooling air plenum through the aft support wall, the at least one cooling air passageway opening at the at least one axially aft-facing surface of the aft support wall such that the at least one cooling air passageway is configured to conduct cooling air through the carrier segment and direct the cooling air out of the carrier segment so as to cool at least one portion of the aft support wall.

* * * * *